United States Patent
Sampath et al.

(10) Patent No.: US 11,400,823 B1
(45) Date of Patent: Aug. 2, 2022

(54) DYNAMIC SCHEDULING OF TASKS AND CHARGING OF AN AUTONOMOUS MOBILE DEVICE

(71) Applicant: AMAZON TECHNOLOGIES, INC., Seattle, WA (US)

(72) Inventors: Sridhar Sampath, Cupertino, CA (US); Adam Barry Fineberg, Saratoga, CA (US)

(73) Assignee: AMAZON TECHNOLGIES, INC., Seattle, WA (US)

( * ) Notice: Subject to any disclaimer, the term of this patent is extended or adjusted under 35 U.S.C. 154(b) by 1118 days.

(21) Appl. No.: 15/950,651

(22) Filed: Apr. 11, 2018

(51) Int. Cl.
*B60L 53/36* (2019.01)
*H02J 7/00* (2006.01)
(Continued)

(52) U.S. Cl.
CPC ............... *B60L 53/36* (2019.02); *B60L 58/12* (2019.02); *G01C 21/20* (2013.01); *G05D 1/0088* (2013.01); *G05D 1/0217* (2013.01); *G05D 1/0225* (2013.01); *H02J 7/007* (2013.01); *H02J 7/0042* (2013.01); *G05B 15/02* (2013.01)

(58) Field of Classification Search
CPC .. G06Q 10/06311; G06Q 10/08; G06Q 10/04; G06Q 10/047; G06Q 10/06315; B60L 2240/72; B60L 53/14; B60L 58/12; B60L 2260/58; B60L 2240/80; B60L 50/60; B60L 53/00; B60L 58/13; B60L 53/35; Y10S 901/01; Y10S 903/93; G06N 20/00; G07C 5/0808; G07C 5/006; G05D 1/0088; G05D 1/021; G05D 1/0225; G05D 1/0217; Y02T 10/70; Y02T 10/7072; Y02T 90/12; Y02T 90/16; Y02T 10/72; Y02T 90/14; Y02T 90/167; Y02T 90/169; Y02T 10/64; B60W 10/26; B60W 20/13; B60W 2510/244; H02J 7/0027; H02J 7/00041; H02J 7/0071; H02J 7/00036; H02J 7/0048;
(Continued)

(56) References Cited

U.S. PATENT DOCUMENTS 10,919,163 B1 * 2/2021 Li ..................... B60L 3/0015
11,020,860 B2 * 6/2021 Cheuvront ............ A47L 9/0477
(Continued)

FOREIGN PATENT DOCUMENTS

CN 109378845 A * 2/2019

*Primary Examiner* — Jelani A Smith
*Assistant Examiner* — Paul A Castro
(74) *Attorney, Agent, or Firm* — Lindauer Law, PLLC

(57) ABSTRACT

A robot operates using electrical power. The robot is able to autonomously return to a dock to recharge its batteries. The robot may perform a variety of tasks that consume electrical power, such as performing video calls, presenting audio or video content, acting as a sentry, and so forth. Usage of the robot is analyzed to predict tasks that a user is likely to request. This information is used along with information about previously scheduled tasks and system tasks to create a list of tasks to be performed and when to perform those tasks. The tasks to be performed are calculated to maximize availability of the robot to the user while minimizing charge/discharge cycles, minimizing the extent of the charge/discharge, and minimizing the use of rapid charging. As a result, the lifespan of the batteries may be increased.

20 Claims, 15 Drawing Sheets

(51) Int. Cl.
  *G05D 1/00*  (2006.01)
  *G05D 1/02*  (2020.01)
  *G01C 21/20*  (2006.01)
  *B60L 58/12*  (2019.01)
  *G05B 15/02*  (2006.01)

(58) Field of Classification Search
  CPC ... H02J 7/042; B25J 9/1679; B64C 2201/042;
   B64C 39/02; G01C 21/3469
  See application file for complete search history.

(56) References Cited

U.S. PATENT DOCUMENTS

2018/0236663 A1\* 8/2018 Cohen .................. H02J 7/0026
2020/0142433 A1\* 5/2020 Venturelli .............. G05D 1/104

\* cited by examiner

TASK DATA 122

Robot: TXK2612
Related users: 960720

| TRANSITION TO WAKE MODE POWER CONSUMPTION: 0.6 WH |
| TRANSITION TO SUSPEND MODE POWER CONSUMPTION: 0.2 WH |
| WAKE MODE (IDLE) POWER CONSUMPTION: 0.3 WH |
| SUSPEND MODE POWER CONSUMPTION: 0.05 WH |

| TASK 402 | PWR. CONS. (WH) 404 | START TIME 406 | DURATION 408 | LIKELIHOOD OF OCCURRENCE 410 |
|---|---|---|---|---|
| SENTRY | 15.0 | 02:45 | 1:00 | 1.0 |
| REVEILLE | 4.0 | 06:00 | 0:15 | 1.0 |
| ALARM | 0.6 | 07:30 | 0:05 | 1.0 |
| VIDEO CALL | 2.7 | 16:00 | 0:30 | 1.0 |
| FAULT REPORT | 0.4 | - | 0:02 | 1.0 |
| SYSTEM UPDATE | 5 | - | 0:15 | 1.0 |
| SEND LOG | 1 | - | 0:05 | 1.0 |
| SEND/RX MESSAGES | 0.4 | - | 0:01 | 1.0 |
| DOWNLOAD CONTENT | 1.7 | - | 0:10 | 1.0 |
| UPDATE MAP | 6.3 | - | 0:50 | 1.0 |
| PRESENT VIDEO | 3.9 | 07:00 | 0:30 | 0.3 |
| PRESENT VIDEO | 7.1 | 12:00 | 1:00 | 0.9 |
| VIDEO CALL | 2.7 | 17:15 | 0:45 | 0.9 |
| PRESENT VIDEO | 3.9 | 20:00 | 0:30 | 0.7 |

FIG. 4

DYNAMIC SCHEDULING OF TASKS AND CHARGING OF AN AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates task data that associates particular tasks with power consumption, start times, and so forth, according to some implementations.

Figure 1:
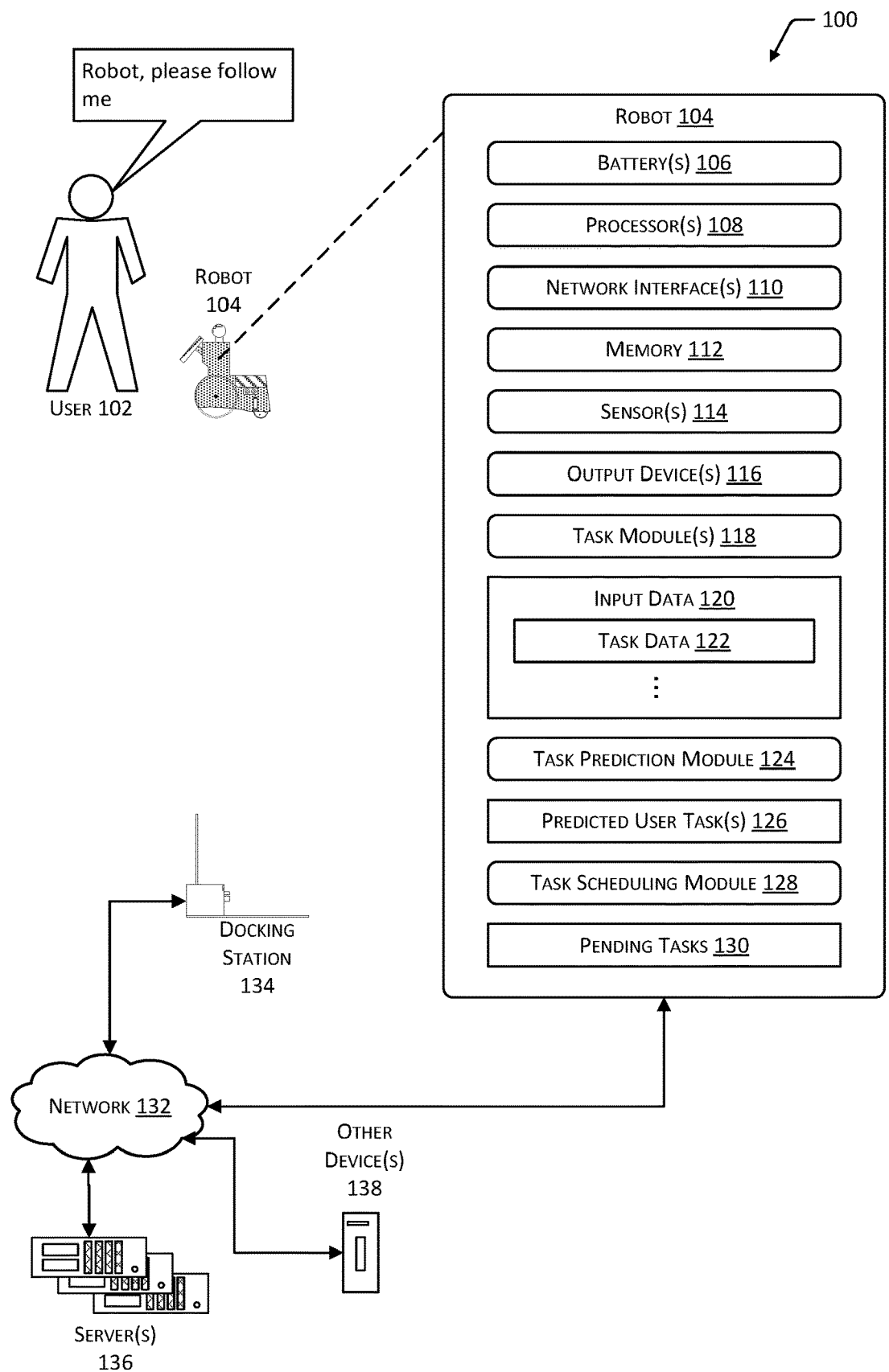
FIG. 1 illustrates a system that includes a robot which is able to dynamically schedule tasks and autonomously charge, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, a robotic assistant (robot) may perform various tasks. Some of these are user tasks that are responsive to a user request or preference while other tasks are system tasks that are associated with maintaining the robot's operation. These tasks may include one or more of executing a particular application or moving the robot. Applications may include particular computer programs comprising instructions, that when executed, perform various functions. For example, a first task may involve the user requesting the robot to play a particular song using a music application. In another example, a second task may involve the user requesting the robot to move to a different room. In another example, a third task may involve the user requesting the robot to initiate a video call and follow the user as they move throughout the home. The robot is capable of autonomous movement, allowing it to move from one location in the home to another without being "driven" or remotely controlled by the user or other human.

The robot operates on electrical power. The electrical power may be provided by one or more batteries (battery) that is rechargeable. For example, the battery powering the robot may comprise some quantity of lithium ion polymer cells. During operation, the robot consumes power stored in the battery. To recharge the battery, the robot may dock or otherwise connect to a docking station, external power source, charging station, and so forth. The robot may be able to autonomously find a docking station or other charging station in the home and begin charging.

The battery, or other power storage device, may be subject to degradation due to charging and discharging. For example, a battery may comprise one or more cells, each cell storing electrical energy in a chemical reaction. Discharging the cells within the battery results in the chemical reaction releasing electrical energy. Charging the cells within the battery results in a reversal of that chemical reaction. However, the process of charging and discharging a battery may result in various side effects. For example, during charging unwanted chemical reactions may also occur that otherwise impair the intended chemical reaction. Over time these reactions may result in damage to components in the battery. This damage may in turn reduce a total battery capacity to store usable electrical energy.

As a result of these and other factors, the number of times that a battery may be discharged and recharged is limited, and so batteries eventually wear out. When the battery is no longer useable, the robot is unable to function and the battery may be costly to replace. In order to extend an operational lifespan of a battery, it is advantageous to minimize the number of times the battery is charged and discharged.

Certain types of battery may also experience more damage during certain types of discharge and charge. For example, the number of times that a battery with lithium ion cells may be discharged and charged may be reduced if those cells are discharged below a minimum charge capacity (for example, 30% of total capacity) or if the cells are charged above an optimum charge capacity that is less than the total capacity of the cell (for example, 70% of total capacity). Continuing the example, if the battery's charge capacity is maintained between 30% and 70% of the total capacity, the battery will be able withstand more charge/discharge cycles, increasing the operational lifespan of the battery.

The robot may also use various techniques to minimize power consumption, further extending battery life. In one implementation, the robot may also be configured to transition one or more components between a normal operational ("wake") mode and a low power ("suspend") mode. For example, if the robot is not moving and no users are nearby, the robot may place a lidar sensor into a low power mode to reduce power consumption. In another example, if the robot is not currently performing a task, the onboard processors and associated components may be transitioned to a suspend mode. However, each transition between the wake and suspend modes consumes electrical power and introduces latency. For example, transitioning to a suspend mode requires power to have the processor complete pre-suspension actions, write data to non-volatile memory, and so forth. Likewise, transitioning from the suspend mode to the wake mode uses power to startup the components, initialize options, and otherwise resume operation. As a result, situations in which the robot is frequently transitioning between suspend and wake modes may result in more power consumption than if the robot remained in the wake mode.

Described in this disclosure are systems and techniques to schedule tasks performed by the robot in such a way that the operational lifespan of the battery is extended while producing little or no impact on the user experience or the robot's ability to perform tasks. By using historical data and other input data, a task prediction module generates a set of predicted user tasks that may take place. The likelihood of these tasks may be based on frequency of occurrence, presence of the user near the robot at the predicted time, and so forth.

A task scheduling module uses the predicted user tasks and information about other tasks, such as immediate tasks, scheduled tasks, and system tasks to generate a set of pending tasks. The set of pending tasks groups together tasks that may be performed at the same time or in sequence while the robot is in the wake mode. For example, the robot may be transition to the wake mode 45 minutes before a predicted task in order to find the docking station, recharge in anticipation of the pending tasks to come, complete system task such as downloading an update, determine the user is nearby, and wait for the user to request the predicted task. In this way, the robot is able to minimize transitions between suspend and wake modes, have enough power in the battery to do the expected tasks without overcharging, and minimize deep discharge of the battery. This may also increase the amount of time the robot is able to remain in the suspend mode and conserve battery power until woken by a predicted task, scheduled task, or command from the user. For example, with the pending tasks and the ability to predict tasks, the robot is able to determine when to enter the suspend mode and conserve battery power and when to be in the wake mode to perform tasks.

The systems and techniques described provide a significant technological improvement by enabling the robot to perform desired tasks while significantly minimizing strain on the battery, thus increasing the operational lifespan of the battery. For example, conventional battery management techniques may result in the robot charging the battery twice per day to perform tasks and may result in the robot having inadequate power to perform some tasks as the first charge dwindles. In this example, the robot may need to deeply discharge the battery below the minimum charge capacity to maintain operation, and then utilize a rapid charge to minimize downtime.

This deep discharge and rapid charge adversely affect the battery, reducing its lifespan. For example, a lithium ion battery may be expected to have an operational lifespan of 2000 charge/discharge cycles when the battery maintains a charge capacity between the minimum charge capacity and the optimum charge capacity. In the earlier example, the pattern of twice daily discharges would result in an operational lifespan of 1000 days under ideal conditions. However, the adverse conditions of deep discharge and rapid charging may reduce the operational lifespan to 1500 charge/discharge cycles, resulting in an operational lifespan of 750 days. As a result of these types of charge/discharge cycles, the operational lifespan of the battery would be reduced by 250 days.

In comparison, the system described in this disclosure minimizes extreme charge/discharge situations, increasing the operational lifespan to a value closer to the optimum. Furthermore, the system described may reduce the number of charge/discharge cycles needed for operation. Returning to the above example, using the techniques described herein, the robot is able to operate using a single charge/discharge cycle during the day, and does so without a deep discharge or rapid charge. As a result, an operational lifespan of 2000 days may be realized.

Additionally, by anticipating tasks, the robot is available to perform those tasks with significantly reduced latency. For example, in anticipation of a user's request to play music when they arrive home, the robot may be transitioned to the wake mode in advance of the user's request, eliminating the need for the user to wait for the robot to resume the wake mode.

Illustrative System

FIG. 1 illustrates a system 100 in which a user 102 uses a robot 104 that is able to dynamically schedule tasks and autonomously charge, according to some implementations. The robot 104 may include a battery(s) 106 to provide electrical power for operation of the robot 104. The battery 106 may be rechargeable, allowing it to store electrical energy obtained from an external source. As described in this disclosure, a "battery" may comprise one or more individual cells. For example, the battery 106 may comprise three electrochemical cells utilizing lithium ion chemistry. The techniques described in this disclosure may be applied to other types of energy storage devices including, but not limited to: regenerative fuel cells, flywheels, capacitors, superconductors, and so forth. For example, instead of a battery 106 the robot 104 may use one or more supercapacitors to store electrical power for use.

The robot may include a hardware processor(s) 108 (processors), a network interface(s) 110, a memory(s) 112, sensors 114, and output devices 116. These devices are discussed in more detail with regard to FIGS. 2 and 3.

One or more task modules 118 may be stored in the memory 112. The task modules 118 may comprise instructions that, when executed by the processor 108 perform a task. For example, a content presentation task module 118 may be used to present video content on a display output device 116 on the robot 104. In another example, a sentry task module 118 may be used to have the robot 104 travel throughout the home and report to the user 102 as to the presence of an unauthorized person.

During operation the robot 104 may determine input data 120. The input data 120 may include task data 122. The task data 122 may provide information for particular tasks or types of tasks such as power consumption for that task, when the task has occurred, and a likelihood that the task will reoccur. The task data 122 may be acquired during operation the robot 104, based on interaction of the user 102 with the robot 104 over time. The task data 122 is discussed in more detail below with regard to FIG. 4. Other input data 120 may include sensor data from the sensors 114 onboard the robot 104. For example, the input data 120 may comprise information indicative of the user 102 being near the robot 104 at a particular time. The input data 120 is discussed in more detail below with regard to FIG. 5.

A task prediction module 124 uses at least a portion of the input data 120 to determine one or more predicted user tasks 126. For example, the predicted user tasks 126 may comprise those tasks which the user 102 has a pattern of requesting, but which are not explicitly scheduled. Operation of the task prediction module 124 is discussed in more detail below with regard to FIGS. 5-7C.

A task scheduling module 128 may use the predicted user tasks 126 and information about other tasks such as immediate tasks, scheduled user tasks, and system tasks to generate a set of tasks to be performed by the robot 104. For example, immediate tasks are those that are to be performed at once and may be the result of a command from the user 102, an urgent system task, and so forth. The scheduled user tasks are those tasks which have been previously scheduled by the user 102 or as a default to provide a service for the user 102. The system tasks comprise tasks associated with maintaining the robot 104 in an operational condition. User tasks may be associated with particular user accounts, while system tasks are not. User tasks may also involve presenting output to a user 102, such as audio or video. System tasks, in comparison, may not involve presenting output to the user 102.

The set of tasks is then partitioned in sets of pending tasks 130. For example, the set of tasks may be ordered by start time (either scheduled or predicted), and a first set of pending tasks 130 may comprise those tasks from the current time until there is a first gap in the set of tasks that exceeds a maximum wait time. A second set of pending tasks 130 may include those tasks in the set of tasks that occur between the first gap and a second gap, and so forth. The pending tasks 130 may include information about estimated power consumption for the respective tasks.

The task scheduling module 128 may then use the pending tasks 130 to control operation of the robot 104 including directing the robot 104 when to recharge, what level to charge the battery 106 to, what level to discharge the battery 106 to, to perform system tasks while the robot 104 is already in the wake mode but otherwise expected to be unused by the user 102 to avoid power consumption due to transitions, and so forth. Operation of the task prediction module 124 is discussed in more detail below with regard to FIGS. 5-7C.

The robot 104 may use the network interfaces 110 to connect to a network 132. For example, the network 132 may comprise a wireless local area network, that in turn is connected to a wide area network such as the Internet.

The robot 104 may be configured to dock or connect to a docking station 134. The docking station 134 may also be connected to the network 132. For example, the docking station 134 may be configured to connect to the wireless local area network such that the docking station 134 and the robot 104 may communicate. The docking station 134 may provide external power which the robot 104 may use to charge the battery 106. The docking station 134 is described in more detail below with regard to FIG. 13.

The robot 104 may access one or more servers 136 via the network 132. For example, the robot 104 may utilize a wake word detection module to determine if the user 102 is addressing a request to the robot 104. The wake word detection module may hear a specified word or phrase, transition the robot 104 or portion thereof to the wake operating mode. Once in the wake mode, the robot 104 may then transfer at least a portion of the audio spoken by the user 102 to one or more servers 136 for further processing. The servers 136 may process the spoken audio and return to the robot 104 data that may be subsequently used to operate the robot 104.

The robot 104 may also communicate with other devices 138. The other devices 138 may include home automation controls, sensors, and so forth that are within the home or associated with operation of one or more devices in the home. For example, the other devices 138 may include a doorbell camera, a garage door, a refrigerator, washing machine, a network connected microphone, and so forth. In some implementations the other devices 138 may include other robots 104, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 2:
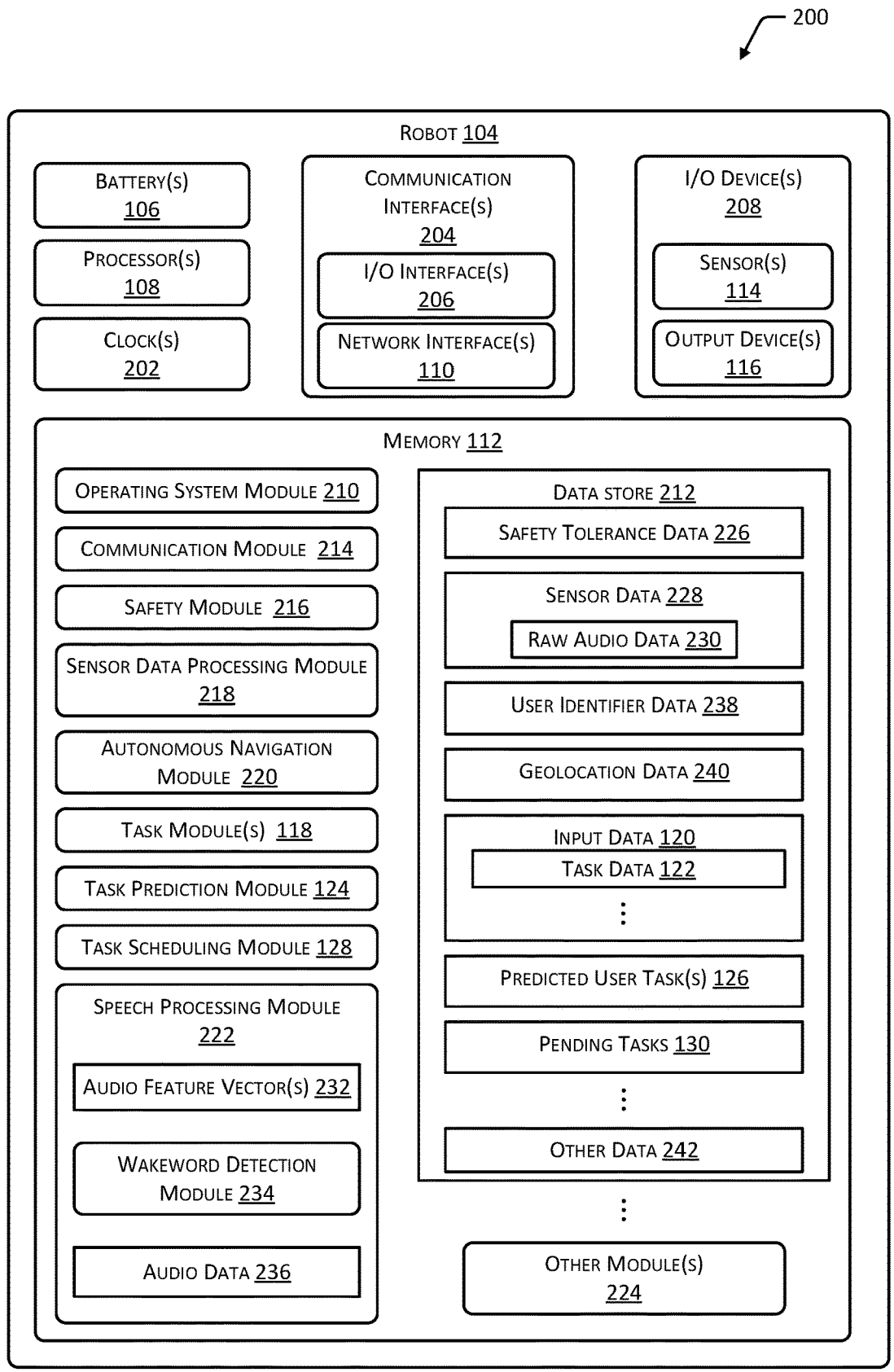
FIG. 2 is a block diagram of the components of the robot, according to some implementations.

FIG. 2 is a block diagram 200 of the robot 104, according to some implementations. The robot 104 may include one or more batteries 106 to provide electrical power suitable for operating the components in the robot 104. In some implementations the battery(s) 106 may be rechargeable. For example, the battery 106 may comprise one or more lithium ion polymer cells that may be discharged and recharged. In other implementations other rechargeable devices may be used to provide electrical power to the robot 104. For example, these rechargeable devices may include, but are not limited to, capacitors, fuel cells, storage flywheels, and so forth.

The robot 104 may include one or more hardware processors 108 (processors) configured to execute one or more stored instructions. The processors 108 may comprise one or more cores. The processors 108 may include microcontrollers, systems on a chip, field programmable gate arrays, digital signals processors, graphic processing units, general processing units, and so forth. One or more clocks 202 may provide information indicative of date, time, ticks, and so forth. For example, the processor 108 may use data from the clock 202 to associate a particular interaction with a particular point in time.

The robot 104 may include one or more communication interfaces 204 such as input/output (I/O) interfaces 206, network interfaces 110, and so forth. The communication interfaces 204 enable the robot 104, or components thereof, to communicate with other devices 138 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 114, keyboard, mouse, scanner, and so forth. The I/O devices 208 may also include output devices 116 such as one or more of a motor, light, speaker, display, projector, printer, and so forth. In some embodiments, the I/O devices 208 may be physically incorporated with the robot 104 or may be externally placed.

The network interfaces 110 may be configured to provide communications between the robot 104 and other devices 138 such as other robots 104, a docking station 134, routers, access points, and so forth. The network interfaces 110 may include devices configured to couple to personal area networks (PANs), local area networks (LANs), wireless local area networks (WLANS), wide area networks (WANs), and so forth. For example, the network interfaces 110 may include devices compatible with Ethernet, Wi-Fi, Bluetooth, Bluetooth Low Energy, ZigBee, and so forth.

The robot 104 may also include one or more busses or other internal communications hardware or software that allow for the transfer of data between the various modules and components of the robot 104.

As shown in FIG. 2, the robot 104 includes one or more memories 112. The memory 112 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 112 provides storage of computer-readable instructions, data structures, program modules, and other data for the operation of the robot 104. A few example functional modules are shown stored in the memory 112, although the same functionality may alternatively be implemented in hardware, firmware, or as a system on a chip (SoC).

The memory 112 may include at least one operating system (OS) module 210. The OS module 210 is configured to manage hardware resource devices such as the I/O interfaces 206, the I/O devices 208, the communication interfaces 204, and provide various services to applications or modules executing on the processors 108. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 112 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices including other robots 104, servers, network attached storage devices, and so forth.

A communication module 214 may be configured to establish communication with other devices 138, such as other robots 104, an external server 136, a docking station 134, and so forth. The communications may be authenticated, encrypted, and so forth.

Other modules within the memory 112 may include a safety module 216, a sensor data processing module 218, an autonomous navigation module 220, the one or more task modules 118, the task prediction module 124, the task scheduling module 128, a speech processing module 222, or other modules 224. The modules may access data stored within the data store 212, such as safety tolerance data 226, sensor data 228, or other data 242.

The safety module 216 may access safety tolerance data 226 to determine within what tolerances the robot 104 may operate safely within the physical environment. For example, the safety module 216 may be configured to stop the robot 104 from moving when a carrying handle is extended. In another example, the safety tolerance data 226 may specify a minimum sound threshold which, when exceeded, stops all movement of the robot 104. Continuing this example, detection of sound such as a human yell would stop the robot 104. In another example, the safety module 216 may access safety tolerance data 226 that specifies a minimum distance from an object that the robot 104 may maintain. Continuing this example, when a sensor 114 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more the motors, and so forth. The safety module 216 may be implemented as hardware, software, or a combination thereof.

The safety module 216 may control other factors, such as a maximum speed of the robot 104 based on information obtained by the sensors 114, precision and accuracy of the sensor data 228, and so forth. For example, detection of an object by an optical sensor 320 may include some error, such as when the distance to an object comprises a weighted average between an object and a background. As a result, the maximum speed permitted by the safety module 216 may be based on one or more factors such as the weight of the robot 104, nature of the floor, distance to object, and so forth. In the event that the maximum permissible speed differs from the maximum speed permitted by the safety module 216, the lesser speed may be utilized.

The sensor data processing module 218 may access sensor data 228 that is acquired from one or more the sensors 114. The sensor data processing module 218 may provide various processing functions such as de-noising, filtering, change detection, and so forth. Processing of sensor data 228, such as images from a camera sensor 344, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 228. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 228 or other data 242. For example, the ANN may be a trained using a supervised learning algorithm such that object identifiers are associated with images of particular objects within training images provided to the ANN. Once trained, the ANN may be provided with the sensor data 228 and produce output indicative of the object identifier.

The autonomous navigation module 220 provides the robot 104 with the ability to navigate within the physical environment without real-time human interaction. For example, the autonomous navigation module 220 may implement one or more simultaneous localization and mapping ("SLAM") techniques to determine an occupancy map or other representation of the physical environment. The SLAM algorithms may utilize one or more of maps, algorithms, beacons, or other techniques to provide navigational data. The navigational data may then be used to determine a path which is then subsequently used to determine a set of commands that drive the motors connected to the wheels. For example, the autonomous navigation module 220 may access environment map data during operation to determine relative location, estimate a path to a destination, and so forth.

The autonomous navigation module 220 may include an obstacle avoidance module. For example, if an obstacle is detected along a planned route, the obstacle avoidance module may re-route the robot 104 to move around the obstacle or take an alternate route.

The autonomous navigation module 220 may utilize various techniques during processing of sensor data 228. For example, image data obtained from cameras may be processed to determine one or more of corners, edges, planes, and so forth. In some implementations corners may be detected and the coordinates of those corners may be used to produce point cloud data.

The occupancy map may be manually or automatically determined. Continuing the example, during the learning phase, or subsequent operation, the robot 104 may generate an occupancy map that is indicative of locations of obstacles such as chairs, doors, stairwells, and so forth.

In some implementations, the occupancy map may include floor characterization data. The floor characterization data is indicative of one or more attributes of the floor at a particular location within the physical environment. During operation of the robot 104, floor characterization data may be obtained. The floor characterization data may be utilized by one or more of safety module 216, the autonomous navigation module 220, the task module 118, or other modules 224. For example, the floor characterization data may be used to determine if an unsafe condition occurs such as a wet floor. In another example, the floor characterization data may be used by the autonomous navigation module 220 assist in the determination of the current location of the robot 104 within the home. For example, if the autonomous navigation module 220 determines that the robot 104 is located in the dining room, but the floor characterization data indicates that the floors consistent with the living room, an error condition may be generated in which other techniques are used to determine the location of the robot 104 or otherwise resolve the difference. For example, the robot 104 may attempt to return to the docking station 134 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 102. For example, the robot 104 may use speech synthesis to ask the user 102 "what room is this?" during a training phase. The utterance of the user may be received by the microphone array and the audio data "this is the living room" may processed and subsequently used to generate the location designator. The floor type may comprise information indicative of the type of flooring associated with a particular location designator. For example, the floor type may be indicative of types such as carpet, wood, tile, and so forth. The floor texture comprises information indicative of the surface texture of the floor, such as whether it is rough, smooth, medium, and so forth. The floor texture may be determined using data obtained from a floor optical motion sensor (FOMS) that is described below with regard to FIG. 3. For example, the texture may be detectable by the FOMS. The coefficient of friction provides data indicative of how slippery the floor is. For example, a very low coefficient of friction is indicative of a slippery surface while high coefficient of friction is a surface in which slippage is minimal. In one implementation, the coefficient of friction may be determined based on data from a friction probe that is in contact with the floor. In another implementation, a predetermined amount of breaking or drag may be applied to one or more of the wheels and the coefficient of friction may be determined based on previously defined parameters such as wheel resistance, amount of breaking applied, amount of power applied to drive wheels, and so forth. In effect, this implementation uses one of the wheels to provide selective drag that is then used to determine the coefficient of friction.

The surface resistivity comprises data indicative of the electrical resistivity of the surface. For example, surface resistivity may be measured between two or more of the conductive wheels as described above. Different types of floor may exhibit different surface resistivity, and changes in that surface resistivity may be used indicate changing conditions. For example, a change in the surface resistivity for a particular portion of the floor may be indicative of the presence of water or other liquid on the floor.

The color of the floor may be determined using input from one or more of the cameras, the FOMS, and so forth. For example, one or more the navigation cameras that are mounted on the front of the robot 104 may be used to acquire color data that is used to determine a color of the floor. In another example, where the FOMS utilize optoelectronic devices that can determine different colors, output from the FOMS may be used to provide the color data.

The autonomous navigation module 220 may be used to move the robot 104 from a first location to a second location within the physical environment. This movement may be responsive to determination made by an onboard processor 108, in response to a command received via one or more communication interfaces 204 or a sensor 114, and so forth. For example, an external server may send a command that is subsequently received using a network interface 110. This command may direct the robot 104 to proceed to a designated destination, such as "living room" or "dining room". The robot 104 may then process this command, and use the autonomous navigation module 220 to determine the directions and distances associated with reaching the specified destination.

The memory 112 may store one or more task module 118. A task module 118 comprises instructions that, when executed, provide one or more functions associated with a particular task. In one example, the task may comprise a security or watchmen task in which the robot 104 travels throughout the physical environment looking for events that exceed predetermined thresholds. Continuing the example, if the robot 104 detects that the ambient temperature is below a minimum level, or that water is present on the floor, or detects sound of broken glass, an alert may be generated. The alert may be given as an audible, visual, or electronic notification. For example, the electronic notification may involve the robot 104 transmitting data using one or more the communication interfaces 204.

In another example, the task may comprise a "follow me" feature in which the robot 104 follows a user 102. For example, the user 102 may participate in a video call using the robot 104. The camera on the mast may be used to acquire video for transmission while the display is used to present video that is received. The robot 104 may use data from one or more sensors 114 to determine a location of the user 102 relative to the robot 104, and track and follow the user 102. In one implementation, computer vision techniques may be used to locate the user 102 within image data acquired by the cameras. In another implementation, the user's voice may be detected by an array of microphones, and a direction to the voice with respect to the robot 104 may be established. Other techniques may be utilized either alone or in combination to allow the robot 104 to track a user 102, follow a user 102, or track and follow a user 102. The path of the robot 104 as it follows the user 102 may be based at least in part on one or more of constraint cost values. For example, while the robot 104 is following the user 102 down the hallway, the robot 104 may stay to the right side of the hallway. In some situations, while following a user 102 the robot 104 may disregard some rules or may disregard the speed values for a particular area. For example, while following the user 102 the robot 104 may not slow down while passing a doorway.

In yet another example, the task may allow for the robot 104 to be summoned to a particular location. The user 102 may utter a voice command that is heard by a microphone on the robot 104, a microphone in a smart phone, or another device with a microphone such as a network enabled speaker or television. Alternatively, the user 102 may issue a command using an app on a smartphone, wearable device, tablet, or other computing device. Given that the location of the device at which the command was obtained is known, the robot 104 may be dispatched to that location. Alternatively, if the location is unknown, the robot 104 may search for the user 102.

The task prediction module 124 determines one or more predicted user tasks 126. As described below, based on previous usage of the robot 104, the task prediction module 124 may anticipate and predict a task that the user 102 may request. During operation the task prediction module 124 may use at least a portion of the input data 120 stored in the data store 212 or elsewhere. Operation of the task prediction module 124 is discussed in more detail elsewhere in this disclosure.

The task scheduling module 128 may use at least a portion of the input data 120 to determine when to perform tasks, when to charge the batteries 106, when to enter a low power or suspend mode, and so forth. The pending tasks 130 may then be stored in the data store 212. Operation of the task prediction module 124 is discussed in more detail elsewhere in this disclosure.

The speech processing module 222 may be used to process utterances of the user. Microphones may acquire audio in the presence of the robot 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the robot 104 for output. For example, the robot 104 may be playing music or other audio that is being received from a network 132 in the form of output audio data. To avoid the output audio interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector) representing features/qualities of the raw audio data 230 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 104 (or separately from speech detection), the robot 104 may use the wakeword detection module 234 to perform wakeword detection to determine when a user intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 234 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks.

LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data 236 (which may include one or more audio feature vectors 232 or the raw audio data 230) to one or more server(s) 136 for speech processing. The audio data 236 corresponding to audio obtained by the microphone may be sent to a server 136 for routing to a recipient device or may be sent to the server 136 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local robot 104 prior to sending.

The robot 104 may connect to the network 132 using one or more of the network interfaces 110. One or more servers 136 may provide various functions, such as ASR, natural language understanding (NLU), providing content such as audio or video to the robot 104, and so forth.

The other modules 224 may provide other functionality, such as object recognition, speech synthesis, user identification, and so forth. For example, an automated speech recognition (ASR) module may accept as input raw audio data 230 or audio feature vectors 232 and may produce as output a text string that is further processed and used to provide input, a task module 118, and so forth. In one implementation, the text string may be sent via a network 132 to a server 136 for further processing. The robot 104 may receive a response from the server 136 and present output, perform an action, and so forth. For example, the raw audio data 230 may include the user saying "robot go to the dining room". The audio data representative of this utterance may be sent to the server 136 that return commands directing the robot 104 to the dining room of the home associated with the robot 104.

The utterance may result in a response from the server 136 that directs operation of other devices or services. For example, the user 102 may say "robot wake me at seven tomorrow morning". The audio data 236 may be sent to the server 136 that determines the intent and generates commands to instruct a device attached to the network 132 to play an alarm at 7:00 am the next day.

The other modules 224 may comprise a speech synthesis module that is able to convert text data to human speech. For example, the speech synthesis module may be used by the robot 104 to provide speech that a user 102 is able to understand.

The data store 212 may also store additional data such as user identifier data 238 that is indicative of the user identifier of a user 102 associated with the robot 104. For example, one or more of the raw audio data 230 or the audio feature vectors 232 may be processed to determine the user identifier data 238 of a user based on the sound of the user's voice. In another implementation an image of the user 102 may be acquired using one or more cameras and processed using a facial recognition system to determine the user identifier data 238.

The data store 212 may also store geolocation data 240. The geolocation data 240 provides information as to the physical location of the robot 104. For example, the geolocation data 240 may indicate city, state, province, country, geographic region, and so forth of the robot 104. In some implementations the geolocation data 240 may distinguish one location from another, but not necessarily provide information about the whereabouts. For example, the geolocation data 240 may indicate "main house" or "guest house" but not indicate the specific location in terms of street address of either location. In some implementations, the task data 122 may be associated with a particular geolocation. For example, the robot 104 may be used at two different houses. When the robot 104 is at the geolocation associated with the first house, first task data 122 may be used. When the robot 104 is at the geolocation associated with second house, a second task data 122 may be used. The geolocation data 240 may be determined based on one or more of network connectivity, radionavigation receiver, and so forth. For example, the geolocation data 240 may be determined based on an identifier such as a service set identifier (SSID), network address, media access control data, and so forth associated with the network 132 to which the robot 104 is connected.

The data store 212 may store other data 242 such as user preference data. For example, the user preference data may be used when a particular user identifier is using the robot 104.

Figure 3:
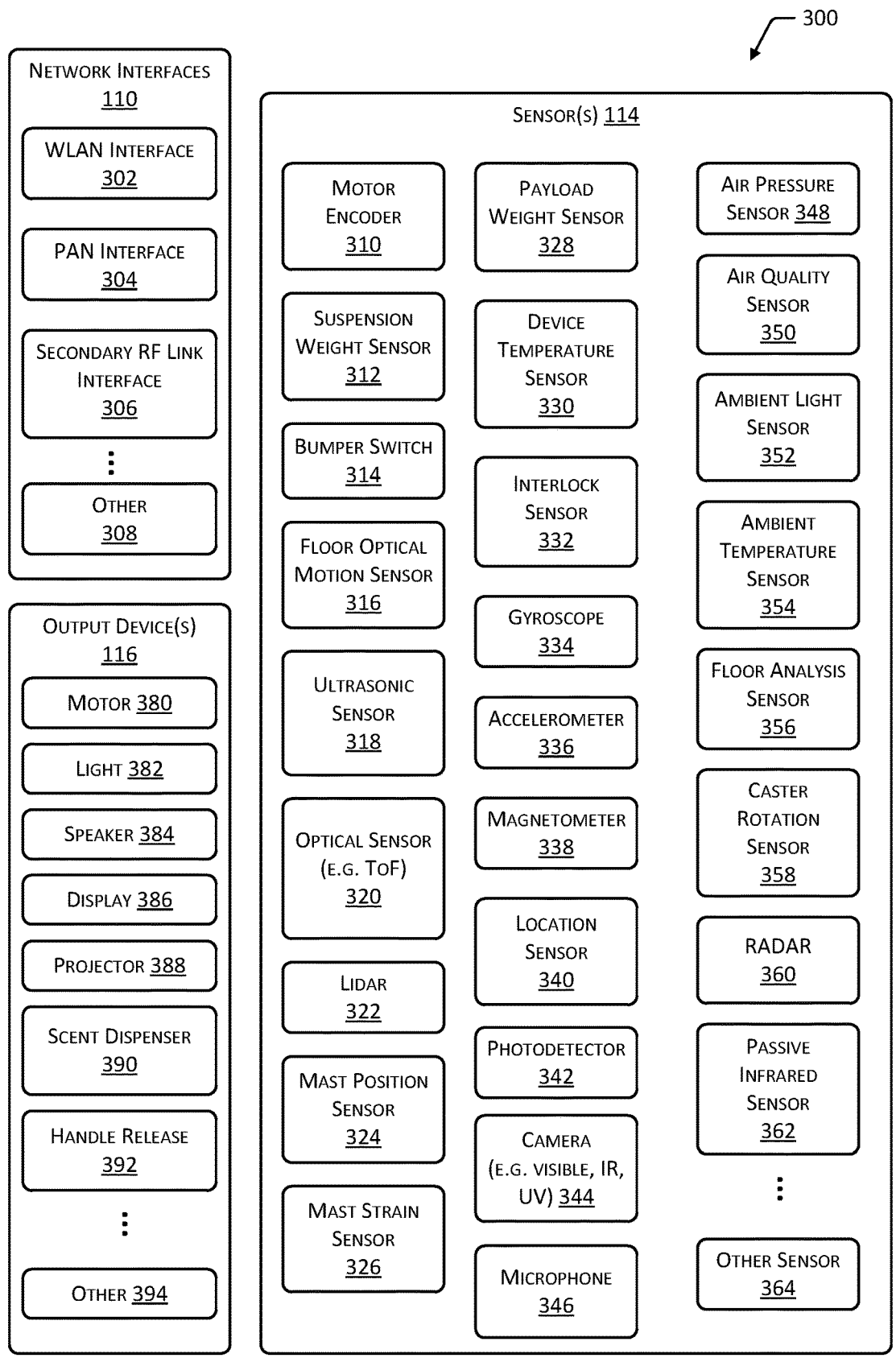
FIG. 3 is a block diagram of some components of the robot such as network interfaces, sensors, and output devices, according to some implementations.

FIG. 3 is a block diagram 300 of some components of the robot 104 such as network interfaces 110, sensors 114, and output devices 116, according to some implementations. The components illustrated here are provided by way of illustration and not necessarily as a limitation. For example, the robot 104 may utilize a subset of the particular network interfaces 110, output devices 116, or sensors 114 depicted here, or may utilize components not pictured.

The network interfaces 110 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilizes frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices 138 in the event that communication fails using one or more of the WLAN interface 302 or the PAN interface 304. For example, in the event the robot 104 travels to an area within the physical environment that does not have Wi-Fi coverage, the robot 104 may use the secondary RF link interface 306 to communicate with another device such as a specialized access point, docking station 134, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates via by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 114. The sensors 114 depicted here are provided by way of illustration and not necessarily as a limitation. It is understood other sensors 114 may be included or utilized by the robot 104, while some sensors 114 may be omitted in some configurations.

A motor encoder 310 provides information indicative of the rotation or linear extension of a motor. The motor may comprise a rotary motor, or a linear actuator. In some implementations, the motor encoder 310 may comprise a separate assembly such as a photodiode and encoder wheel that is affixed to the motor. In other implementations, the motor encoder 310 may comprise circuitry configured to drive the motor. For example, the autonomous navigation module 220 may utilize the data from the motor encoder 310 to estimate a distance traveled.

A suspension weight sensor 312 provides information indicative of the weight of the robot 104 on the suspension system for one or more of the wheels 802 or the caster 804. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel 802. In other implementations, the suspension weight sensor 312 may provide an indication such as so many kilograms of force or newtons of force. The suspension weight sensor 312 may be affixed to one or more of the wheels 802 or the caster 804. In some situations, the safety module 216 may use data from the suspension weight sensor 312 to determine whether or not to inhibit operation of one or more of the motors. For example, if the suspension weight sensor 312 indicates no weight on the suspension, the implication is that the robot 104 is no longer resting on its wheels 802, and thus operation of the motors may be inhibited. In another example, if the suspension weight sensor 312 indicates weight that exceeds a threshold value, the implication is that something heavy is resting on the robot 104 and thus operation of the motors may be inhibited.

One or more bumper switches 314 provide an indication of physical contact between a bumper or other member that is in mechanical contact with the bumper switch 314. Safety module 216 utilize sensor data 228 obtained by the bumper switches 314 to modify the operation of the robot 104. For example, if the bumper switch 314 associated with a front of the robot 104 is triggered, the safety module 216 may drive the robot 104 backwards.

A floor optical motion sensor (FOMS) 316 provides information indicative of motions of the robot 104 relative to the floor or other surface underneath the robot 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 utilize sounds in excess of 20 kHz to determine a distance from the sensor to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 228 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 114 such as an image sensor or camera. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, safety module 216 and the autonomous navigation module 220 may utilize the sensor data 228 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 228 may be generated that is indicative of the presence of objects and the relative positions, shapes, and so forth is visible to the lidar 322. Data from the lidar 322 may be used by various modules. For example, the autonomous navigation module 220 may utilize point cloud data generated by the lidar 322 for localization of the robot 104 within the physical environment.

A mast position sensor 324 provides information indicative of a position of the mast. For example, the mast position sensor 324 may comprise limit switches associated with the mast extension mechanism that indicate whether the mast 914 is an extended or retracted position. In other implementations, the mast position sensor 324 may comprise an optical code on at least a portion of the mast 914 that is then interrogated by an optical emitter and a photodetector to determine the distance which the mast 914 is extended. In another implementation, the mast position sensor 324 may comprise an encoder wheel that is attached to a mast motor that is used to raise or lower the mast 914. The mast position sensor 324 may provide data to the safety module 216. For example, if the robot 104 is preparing to deploy the carrying handle, data from the mast position sensor 324 may be checked to determine if the mast 914 is retracted, and if not, the mast 914 may be retracted prior to deployment of the carrying handle. By retracting the mast 914 before the carrying handle is deployed, injury to the user 102 as well as damage to the mast 914 is avoided as the user 102 bends down to grasp the carrying handle.

A mast strain sensor 326 provides information indicative of a strain on the mast with respect to the remainder of the robot 104. For example, the mast strain sensor 326 may comprise strain gauge or load cell that measures a side-load applied to the mast 914 or a weight on the mast 914 or downward pressure on the mast 914. The safety module 216 may utilize sensor data 228 obtained by the mast strain sensor 326. For example, if the strain applied to the mast 914 exceeds a threshold amount, the safety module 216 may direct an audible and visible alarm to be presented by the robot 104.

A payload weight sensor 328 provides information indicative of the weight associated with the modular payload bay 912. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay 912 has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more the batteries 106, one or more motors, and so forth. In the event the temperature exceeds a threshold value, the component associated with that device temperature sensor 330 may be shut down.

One or more interlock sensors 332 may provide data to the safety module 216 or other circuitry that prevents the robot 104 from operating in an unsafe condition. For example, the interlock sensors 332 may comprise switches that indicate whether an access panel is open, if the carrying handle is deployed, and so forth. The interlock sensors 332 may be configured to inhibit operation of the robot 104 until the interlock switch indicates a safe condition is present.

A gyroscope 334 may provide information indicative of rotation of an object affixed thereto. For example, gyroscope 334 may generate sensor data 228 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more locations sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provide sensor data 228 indicative of impinging light. For example, the photodetector 342 may provide data indicative of a color, intensity, duration, and so forth.

A camera 344 generates sensor data 228 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 104 may use image data acquired by the camera 344 for object recognition, navigation, collision avoidance, user communication, and so forth. For example, a pair of cameras 344 sensitive to infrared light may be mounted on the front of the robot 104 to provide binocular stereo vision, with the sensor data 228 comprising images being sent to the autonomous navigation module 220. In another example, the camera 344 may comprise a 10 megapixel or greater camera that is used for videoconferencing or for acquiring pictures for the user 102.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 220 may be acquired using a rolling shutter and subsequently may be processed to mitigate image artifacts.

One or more microphones 346 may be configured to acquire information indicative of sound present in the physical environment. In some implementations, arrays of microphones 346 may be used. These arrays may implement beamforming techniques to provide for directionality of gain. The robot 104 may use the one or more microphones 346 to acquire information from acoustic tags, accept voice input from users 102, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include hygrometer that provides information indicative of relative humidity.

An ambient light sensor 352 may comprise one or more photodetector's or other light-sensitive elements that are used to determine one or more of the color, intensity, duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, floor analysis sensor 356 may comprise circuitry that may be used to determine one or more of the electrical resistance, electrical inductance, or electrical capacitance of the floor. For example, two or more of the wheels 802 in contact with the floor may include an allegedly conductive pathway between the circuitry and the floor. By using two or more of these wheels 802, the circuitry may measure one or more of the electrical properties of the floor. Information obtained by the floor analysis sensor 356 may be used by one or more of the safety module 216, the autonomous navigation module 220 the task module 118, and so forth. For example, if the floor analysis sensor 356 determines that the floor is wet, the safety module 216 may decrease the speed of the robot 104 and generate a notification alerting the user 102.

The floor analysis sensor 356 may include other components as well. For example, coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster 804 transitioned from an angle of 0° at a first time to 49° at a second time.

The sensors 114 may include a radar 360. The radar 360 may be used to provide information as to a distance, lateral position, and so forth, to an object.

The sensors 114 may include a passive infrared (PIR) sensor 362. The PIR 362 may be used to detect the presence of people, pets, hotspots, and so forth. For example, the PIR 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture camera, and so forth. For example, NFC tags may be placed at various points within the physical environment to provide landmarks for the autonomous navigation module 220. One or more touch sensors may be utilized to determine contact with a user 102 or other object.

The robot 104 may include one or more output devices 116. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesterol display, interferometric display, and so forth. The display 386 may be used to present visible information such as graphics, pictures, text, and so forth. In some implementations, the display 386 may comprise a touchscreen that combines a touch sensor and a display 386.

In some implementations, the robot 104 may be equipped with a projector 388. The projector 388 may be able to project an image on the surface, such as the floor, wall, ceiling, and so forth.

A scent dispenser 390 be used to emit one or more smells. For example, the scent dispenser 390 may comprise a plurality of different scented liquids that may be evaporated or vaporized in a controlled fashion to release predetermined amounts of each.

A handle release 392 may comprise an electrically operated mechanism such as one or more of a motor, solenoid, piezoelectric material, electroactive polymer, shape-memory alloy. In one implementation, the handle release 392 may release a latch and allows a spring to push the carrying handle into the deployed position. In another implementation, the electrically operated mechanism may provide the force that deploys the carrying handle. Retraction of the carrying handle may be manual or electronically activated.

In other implementations, other 394 output devices may be utilized. For example, the robot 104 may include a haptic output device that provides output that produces particular touch sensations to the user. Continuing the example, a motor 380 with an eccentric weight may be used to create a buzz or vibration to allow the robot 104 to simulate the purr of a cat.

FIG. 4 illustrates at 400 task data 122, according to some implementations. The task data 122 is illustrated as a table by way of illustration and not necessarily as a limitation. In other implementations, the task data 122 may be stored in other data structures, executable code, and so forth. In this illustration, the task data 122 is associated with a particular robot 104 and is also associated with particular users 102. For example, the task data 122 includes data that indicates particular user identifiers as specified in the user identifier data 238. In some implementations, the task data 122 may be associated with a particular geolocation, such as indicated by geolocation data 240.

In some implementations, such as shown here, the task data 122 may include the power consumed during transition between the wake and suspend modes. For example, the transition of the robot 104 from suspend mode to wake mode may consume 0.6 Wh. Continuing the example, the transition of the robot 104 from wake mode to suspend mode may consume 0.2 Wh. Also shown is wake mode (idle) power consumption of 0.3 Wh and suspend mode power consumption of 0.05 Wh.

The task data 122 may include data indicative of a task 402 or type of task, power consumption 404 of the task, a start time 406 of the task, a duration of the task 408, and a likelihood of occurrence 410 of the task. The task 402 designates a particular task or type of task. For example, the task 402 may be generalized, such as use of the sentry task module 118. In other implementations, the task 402 may be specific to a particular task 402, such as using the sentry task module 118 starting at 2:45 on weekday mornings.

The power consumption 404 is expressed in units of Watt-hours (Wh). In other implementations, other units may be used. The values may be based on averages, maximums, or other functions that may be applied to data obtained from prior operation of the robot 104. In some implementations, predefined values of power consumption 404 may be used. Power consumption 404 may be determined using one or more techniques. For example, a power meter may be used to monitor power transfer from the battery 106 to the robot 104. Output from the power meter may be combined with data indicative of a start and end of operation of a task module 118 to determine power associated with that task 402. In another example, a charge capacity indicative of power stored in the battery 106 may be obtained from a battery controller of the battery 106 before and after a task module 118 has been used. Based on the difference between the before and after, power consumptions 404 associated with that task 402 may be determined. In other implementations other techniques may be used, such as inferring power consumption 404 based on predefined power consumption values for components and data indicative of how long those components were used by a task module 118.

The start time 406 comprises information indicative of a scheduled start time or a historical start time associated with the task 402. For example, with a scheduled task such as sounding an alarm to wake up the user 102, the start time 406 designates the actual time at which that task 402 is to begin. In comparison, the start time 406 for an unscheduled task may be based on the average time of the last 10 occurrences of that unscheduled task.

The duration 408 comprises information about a scheduled or historical duration of that task 402. For example, the duration 408 for a scheduled sentry task with a specific start and end time indicates the total time the robot 104 is performing that function. In comparison, some scheduled tasks may vary in duration. In this situation the duration 408 may indicate a value based on previous durations for performance of the task 402, such as an average duration, moving average duration, maximum duration, and so forth.

The likelihood of occurrence 410 provides information indicative of how likely the task 402 is to take place. For example, a scheduled task 402 may have a likelihood of 1.0, indicating that the task 402 is expected to happen. In comparison, an unscheduled task may have a likelihood of 0.7, indicating that it is likely to occur 70% of the time. The likelihood of occurrence 410 may be determined by applying one or more probability functions to historical data associated with the task 402. In some implementations the likelihood of occurrence 410 may be based at least in part on the input data 120. For example, if the input data 120 indicates that the user 102 is present within a threshold time of the start time 406, the likelihood of occurrence 410 for that task 402 may be increased. Likewise, if the input data 120 indicates that the user 102 is not presented within the threshold time of the start time 406, the likelihood of occurrence 410 for that task 402 may be decreased.

In some implementations the data in the task data 122 may be provided by a classifier, probabilistic model, neural network, and so forth. For example, historical usage data may be used to train a neural network which, when provided with an input of a particular task 402 produces the other data as output.

The task data 122 may be based on historical data indicative of one or more tasks 402 or types of tasks and the power consumed by the robot 104 to perform the one or more tasks or types of tasks. In some implementations at least a portion of this historical data may be associated with a particular user identifier, geolocation, and so forth. In some implementations, the task data 122 may be based on the last k instances of a particular task, where k is a non-zero integer value. For example, the task data 122 may be based on an average of the last 20 occasions on which the task 402 was performed.

In some implementations, task data 122 may be aggregated from a plurality of robots. For example, the user 102 may have several robots 104 within the same house. The task data 122 from these different robots may be combined, shared, and so forth. In another example, different users 102 may have the same type of robot 104 in different locations. Task data 122 may be generated by aggregating data from these different robots 104. In some implementations, this aggregated data may be used as initial task data 122. For example, task data 122 based on aggregated data may be used until data associated with the particular user 102 has been gathered.

Figure 5:
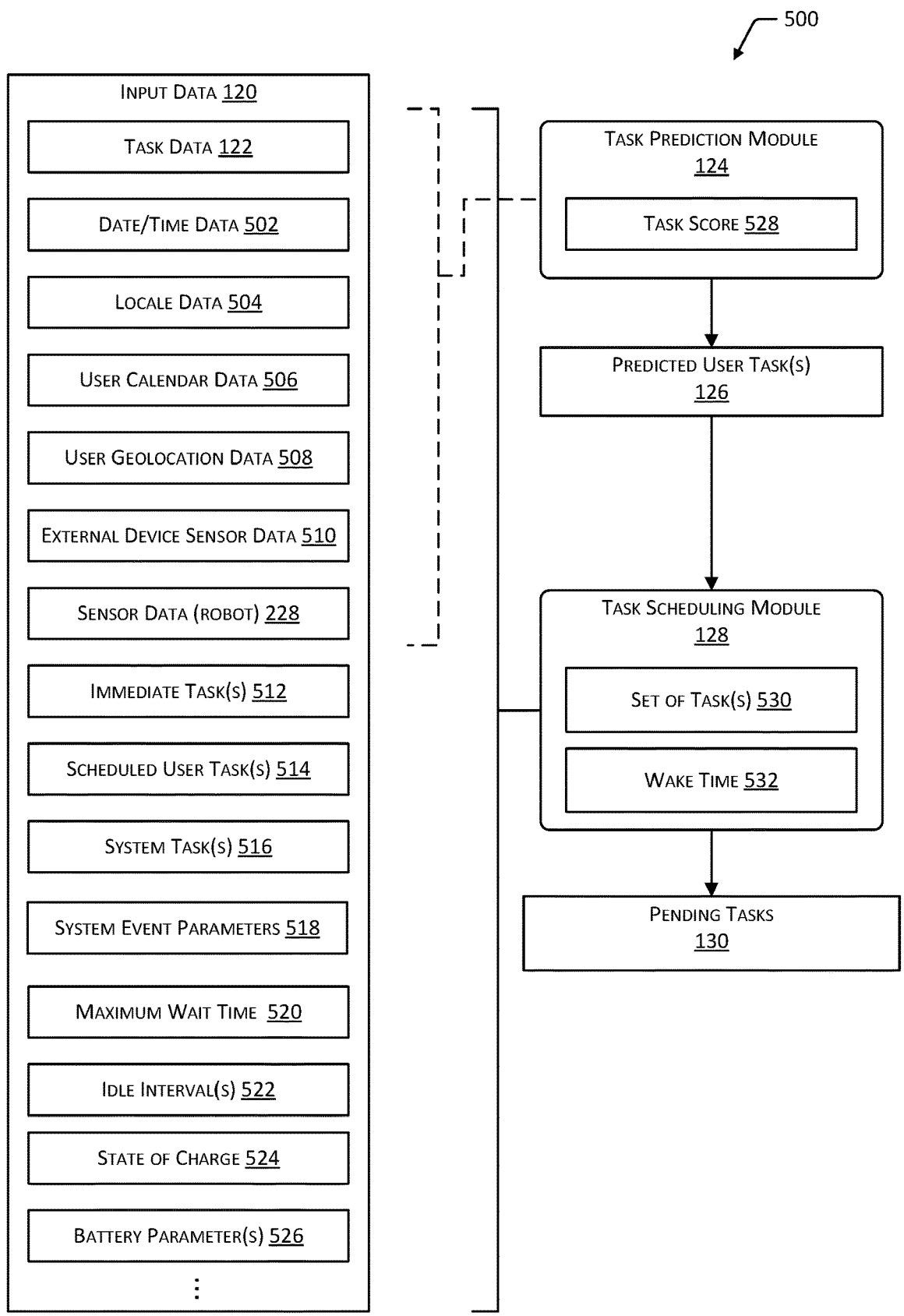
FIG. 5 is a block diagram of input data that may be used by a task prediction module and a task scheduling module to dynamically schedule tasks and charging, according to some implementations.

FIG. 5 is a block diagram 500 of input data 120 that may be used by a task prediction module 124 and a task scheduling module 128 to dynamically schedule tasks and charging, according to some implementations.

The input data 120 may include the task data 122, such as described above in FIG. 4.

The input data 120 may include one or more of the following types of data.

Date/time data 502. For example, the clock 202 may be used to provide data indicative of a current time, date, day of week, and so forth.

Locale data 504 comprises data that is associated with a particular locale, such as a political subdivision such as a state or country, culture, and so forth. For example, the locale data 504 may comprise data such as official holidays observed by a particular state, country, or city. In some implementations the locale data 504 may be determined based at least in part on the geolocation data 240 indicative of the location of the robot 104.

User calendar data 506 comprises information associated with one or more of a personal calendar or work calendar associated with the user 102. For example, during setup of the robot 104, the user 102 may opt in to allow the robot 104 to access at least a portion of the data in that user's calendar. In some implementations the data accessed and used by the robot 104 may be limited to free/busy information, information indicative of an address or location of a calendar item, and so forth.

User geolocation data 508 provides information indicative of the user's physical location. The user geolocation data 508 may be determined based on data from various sensors 114 or sources. For example, the user geolocation data 508 may be determined based on a geolocation provided by an application executing on a smartphone that is in the user's possession. In another example, the user geolocation data 508 may be determined based on data from sensors 114 or other devices 138 in the house or at other locations.

External device sensor data 510 comprises sensor data obtained from sensors 114 that are external to the robot 104. For example, the external device sensor data 510 may comprise information such as data indicative of the refrigerator being opened and closed, data indicative of what wireless devices are connected to an access point, and so forth. Continuing the example, the external device sensor data 510 may indicate that a smartphone associated with the user 102 is current associated with the access point at the home, providing data indicative of the user's presence in the home.

Sensor data 228 from the sensors 114 of the robot 104 may also be used as input. For example, the sensor data 228 may provide information that is indicative of the user 102 being in the same room as the robot 104, information indicative of the user's 102 identity, and so forth.

Input data 120 may also include immediate tasks 512. Immediate tasks 512 are those tasks which are to be executed as soon as possible. For example, an immediate task 512 may comprise the user 102 issuing an order to "follow me". In another example, an immediate task 512 may be an urgent system task, such as an update to address a critical problem. Scheduled user tasks 514 comprise tasks which have been previously scheduled by the user 102 or have been scheduled as a default to provide a service for the user 102. For example, the scheduled user task 514 may comprise an alarm task that awakens the user 102 in the morning.

System tasks 516 comprise tasks associated with maintaining the robot 104 or otherwise operating the robot 104. For example, system tasks 516 may comprise downloading and installing software updates, uploading log data, reporting faults, generating occupancy map data, performing offline processing of previously stored data, clearing cache files, rebooting the robot 104, and so forth. System tasks 516 may or may not be requested by the user 102. For example, the user 102 may request a system task 516, such as ordering a manual update of the robot's 104 software. The system tasks 516 may be scheduled to run at particular times, on an "as needed" basis, on a time available basis, and so forth.

System task parameters 518 specify one or more parameters with respect to the performance of system tasks 516. For example, a system task parameter 518 may specify that a firmware update to the network interface 110 must be performed while the robot 104 is docked at the docking station 134. In another example, the system task parameters 518 may specify a minimum amount of available power in the battery 106 prior to performing a particular type of system task 516.

A maximum wait time 520 specifies a maximum wait time for which the robot 104 will be idle between tasks before transitioning the suspend mode. The maximum wait time 520 may be based at least in part on the task data 122. For example, the transition to wake mode power consumption and the transition to suspend mode power consumption may be used to determine the maximum wait time 520, such that power loss due to transitions is minimized. In some implementations the maximum wait time 520 may be predefined. The maximum wait time 520 may be used to partition tasks in the pending tasks 130, as described herein.

Idle interval(s) 522 provides data about periods of time that are free from one or more of scheduled user tasks 514, predicted user tasks 126 having a confidence level greater than a threshold value, or scheduled system tasks 516. An idle interval 522 is a time during which the robot 104 is unoccupied and is not expected to be performing any tasks 402. In some implementations, the idle intervals 522 may be determined based on historical usage data of the robot 104.

State of charge 524 provides information indicative of the power that is deemed available within the battery 106 for use by the robot 104. The state of charge 524 may be expressed as Watt-hours, as a percentage of total battery capacity, and so forth. The state of charge 524 may be obtained at a particular point in time by interrogating a battery controller of the battery 106, measuring one or more characteristics of the battery 106, and so forth. For example, the state of charge 524 may be determined based on data indicative of a temperature of the battery 106 and a voltage measured across the terminals of the battery 106.

Battery parameters 526 specify parameters associated with operation and use of the battery 106. A total battery capacity may indicate the maximum possible amount of power that the battery 106 may store when fully charged. The battery parameters 526 may also specify charge rates that may be used to charge the battery 106. For example, a first charge rate may be used to slow charge the battery 106. Slow charging minimizes heating of the battery 106 by limiting one or more of the charging current or charging voltage to below predetermined thresholds. In comparison, a second charge rate may be used to rapid charge the battery 106. For example, the second charge rate may utilize one or more of a charging current or charging voltage that are greater than those used by the first charge rate. Rapid charging allows power to be transferred to the battery 106 quickly, but may reduce the operational life of the battery 106.

The battery parameters 526 may specify a first charge capacity that is indicative of a minimum charge that should remain in the battery 106. The first charge capacity may be determined to minimize degradation of the battery 106. While the battery 106 may be discharged below the first charge capacity, such discharge may reduce the operational life of the battery 106.

The battery parameters 526 may specify a second charge capacity that is indicative of an optimum charge that is less than the total battery capacity 106. The second charge capacity may be determined to minimize degradation of the battery 106. While the battery 106 may be charged above the second charge capacity, such charging may reduce the operational life of the battery 106.

The battery parameters 526 may be specific to a particular type of battery 106, a particular battery 106, particular cells within the particular battery 106, and so forth.

The task prediction module 124 generates a set of predicted user tasks 126. These predicted user tasks 126 are tasks which the robot 104 deems are likely to occur based on the input data 120.

In one implementation the task prediction module 124 may use one or more machine learning techniques to predict what and when tasks may be requested by the user 102. For example, historical usage data may be used to train a neural network which, when provided with input data 120, produces output that is indicate of a task and a likelihood that the task will be requested at a particular time. In another example, a probabilistic model may be built based on the historical data. During use, the probabilistic model may use the input data 120 to dynamically adjust the likelihood that a particular task will be requested. If the particular task as predicted is actually initiated by the user 102, the weighting of that task may be increased. Likewise, if the particular task as predicted is not initiated by the user 102, the weighting of that task may be decreased.

In one implementation the task prediction module 124 may assess at least some of the tasks 402 in the task data 122. For example, the task prediction module 124 may generate a task score 528 for one or more of the tasks 402. The task score 528 may be based at least in part on one or more of the current time (such as indicated by the date/time data 502), the estimated start time 406 for the type of task 402, the likelihood of occurrence for the type of task 410, proximity of the user 102 to the robot 104, presence of the user 102 at the same facility as the robot 104, the user calendar data 506, and so forth. For example, the task score 528 may be the product of a reciprocal of a difference between the current time and the estimated start time 406, the likelihood of occurrence for the type of task 410, and a value indicative of proximity of the user 102 to the robot 104. If a task 402 exhibits a task score 528 that exceeds a threshold value, it may be included in the set of predicted user tasks 126.

The task scores 528 may change dynamically as new information is obtained. For example, an unscheduled video call task that has taken place every weekday at the same time will have a high likelihood of occurrence 410. A relatively high task score 528 for this task 402 may be based on this likelihood of occurrence 410, user calendar data 506 that includes information associated with a video call today at the same time, and sensor data 228 from the robot 104 that indicates the user 102 is present near the robot 104. In comparison, if the user 102 was not determined to be present in the home where the robot 104 is located, and is not on the way home, the task score 528 for that video call may be below a threshold needed to prepare the robot 104 for that task 402.

The task scheduling module 128 may use the input data 120 and the predicted user tasks 126 to determine a set of pending tasks 130. The task scheduling module 128 may determine a set of tasks 530. These are tasks that the robot 104 is to perform and that the robot 104 is likely to perform. The set of tasks 530 may be determined for a particular interval of time. For example, the task scheduling module 128 may "look ahead" for a time interval of the next 24 hours. The set of tasks 530 may include one or more of the one or more immediate tasks 512, the one or more scheduled user tasks 514 that have start times within the time interval of the current time, the one or more predicted user tasks 126 that have start times within the time interval, or the one or more system tasks 516 that have start times within the time interval.

The set of tasks 530 may include a variety of different tasks with various start times that occur within the "look ahead" time interval. The task scheduling module 128 then looks to partition these tasks into sets of pending tasks 130, interspersed with idle intervals 522. In one implementation, the partitioning may be based on a gap time that occurs between consecutive tasks in the set of tasks 530. If the gap time exceeds the maximum wait time 520, then the tasks in the set of tasks 530 may be partitioned. For example, the tasks in the set of tasks 530 may be sorted based on their respective start times 406. The maximum wait time 520 indicative of a maximum wait time between performance of tasks 402 may be accessed. A first gap time may be determined that is indicative of a start of a first interval between two tasks in the first set of tasks 530 that has a duration that exceeds the maximum wait time 520. A first set of pending tasks 130 may be determined as the tasks in the set of tasks 530 with start times between the current time and the first gap time. Likewise, a second set of pending tasks 130 may be determined as the tasks 402 in the set of tasks 530 with start times 406 after the first gap time and before a second gap time, and so forth.

The task scheduling module 128 may determine an estimated power consumption for the set of predicted tasks 130. This estimated power consumption may be compared to the state of charge 524 and the battery parameters 526 to determine if the robot 104 will need to recharge the battery 106. For example, if the difference between the estimated power consumption for the first set of pending tasks 130 and the state of charge 524 is greater than the first charge capacity, the robot 104 would not recharge. However, if the difference is less than the first charge capacity, the robot 104 would proceed to autonomously recharge. Based on the estimated power consumption, the robot 104 would charge to a level that is able to at least meet the expected demands of the pending tasks 130, such as the second charge capacity of 70% of total battery capacity. For example, if a charge to the second charge capacity is sufficient to meet the estimated power consumption, then the battery 106 would be charged to this second charge capacity. Otherwise, the battery 106 may be charged to the total battery capacity, e.g., 100% charge.

The task scheduling module 128 may also use input data 120 and the set of pending tasks 130 to determine a charging rate for the battery 106. As described above, the battery 106 may be charged at different rates, with higher charge rates reducing the operational life of the battery 106. As a result, the task scheduling module 128 will preferentially schedule the low or slow charging rate of the battery 106 if there is time to do so before the next task 402 in the pending tasks 130. For example, if the task scheduling module 128 determines that a charge for a particular amount of power will be needed, a first estimated charging time may be calculated for the first charge rate and a second estimated charging time may be calculated for the second charge rate. The estimated charging time is indicative of an estimated amount of time to charge the battery 106 to a predetermined capacity, given a particular charge rate by a battery charger. For example, the estimated charging time may be determined by dividing an estimated charge capacity by the charge rate. The estimated charge capacity is indicative of amount of power to be transferred to the battery 106 to reach the predetermined capacity. For example, the estimated charging time may be calculated using the second charge capacity less the difference between the first charge capacity and the estimated power consumption, divided by the charge rate. In another example, the estimated charging time may be calculated by dividing the difference between the total battery capacity and an estimated remaining capacity after completion of the tasks by the charge rate.

If the time before the start time 406 of the next task 402 in the pending tasks 130 is greater than or equal to the first charging time, the robot 104 will be directed to charge at the first charge rate. Otherwise, the robot 104 would be directed to charge at the second charge rate.

In some implementations the task scheduling module 128 may determine a wake time 532 for the robot 104. For example, if the first start time 406 for a first task 402 in the first set of pending tasks 130 occurs at a time greater than the maximum wait time 520, the task scheduling module 128 may calculate the wake time 532 at which time the robot 104 will transition from the suspend mode to the wake mode in order to perform the first task 402 at the scheduled time.

In some implementations the system tasks 516 included in the pending tasks 130 may comprise a wakeup task to transition the robot 104 or components thereof to a wake mode, a suspend task to transition the robot 104 or components thereof to a suspend mode, a charge task to perform a battery charge, and so forth.

The task scheduling module 128 may use the estimated charging time of the next charge to calculate the wake time 532. For example, if the robot 104 has been determined to need an additional charge before the next task 402 in the pending tasks 130, the wake time 532 may be adjusted to allow the robot 104 time to transition to the wake mode, move to the docking station 134, and complete the charge before the next task 402 is to occur.

The task scheduling module 128 uses the pending tasks 130 and the idle intervals 522 to minimize transitions between the wake and suspend modes. Some tasks 402 may be designated to occur within particular time windows or particular frequencies, but need not occur at specified times. For example, a system task 516 may involve checking for and installing a software update once every 24 hours. The task scheduling module 128 may schedule these kinds of tasks to occur before, after, or before and after other tasks. For example, a sentry task may occur from 2:45 until 3:45, followed by an idle interval 522 until 5:00 when the robot 104 is scheduled to wake and charge for reveille tasks at 6:00. The task scheduling module 128 may add the system task 516 of the software update to take place at 4:45, before the charging. The wake time 532 may be adjusted accordingly, such that the robot 104 transfers to the wake mode, docks with the docking station 134, performs the software update, and then the reveille task as scheduled.

In some situations the task scheduling module 128 may vary the start time 406 of some of the pending tasks 130. For example, those pending tasks 130 that do not involve specific user interaction, such as system tasks 516, sentry tasks, cleaning tasks, and so forth, may be scheduled based on their estimated power consumption 404, duration 408, and so forth. In effect, the task scheduling module 128 may adjust the start time 406 of the pending tasks 130 and in some situations move tasks from one set of pending tasks 130 to another in order to maximize task performance using available battery power and time. Continuing the example, if the robot 104 is expected to be otherwise idle and will have 10 Wh of charge available above the first charge capacity before a charge event, the robot 104 may perform a cleaning task that uses 9 Wh that was scheduled for later in the day.

Operation of the task prediction module 124 and the task scheduling model 128 may be dynamic. For example, both may generate updated predicted user tasks 126 and pending tasks 130 after occurrence of a particular event such as receiving a new task 402, at particular time intervals when in the wake mode, and so forth.

By using these techniques, the robot 104 is able to maintain sufficient charge to perform the pending tasks 130, is in the wake mode in anticipation of predicted user tasks 126, while minimizing the number of charge/discharge cycles, minimizing the extent of those charge/discharge cycle, and minimizing occurrence of rapid charging of the battery 106. As a result, the operational lifespan of the battery 106 is improved.

Figure 6:
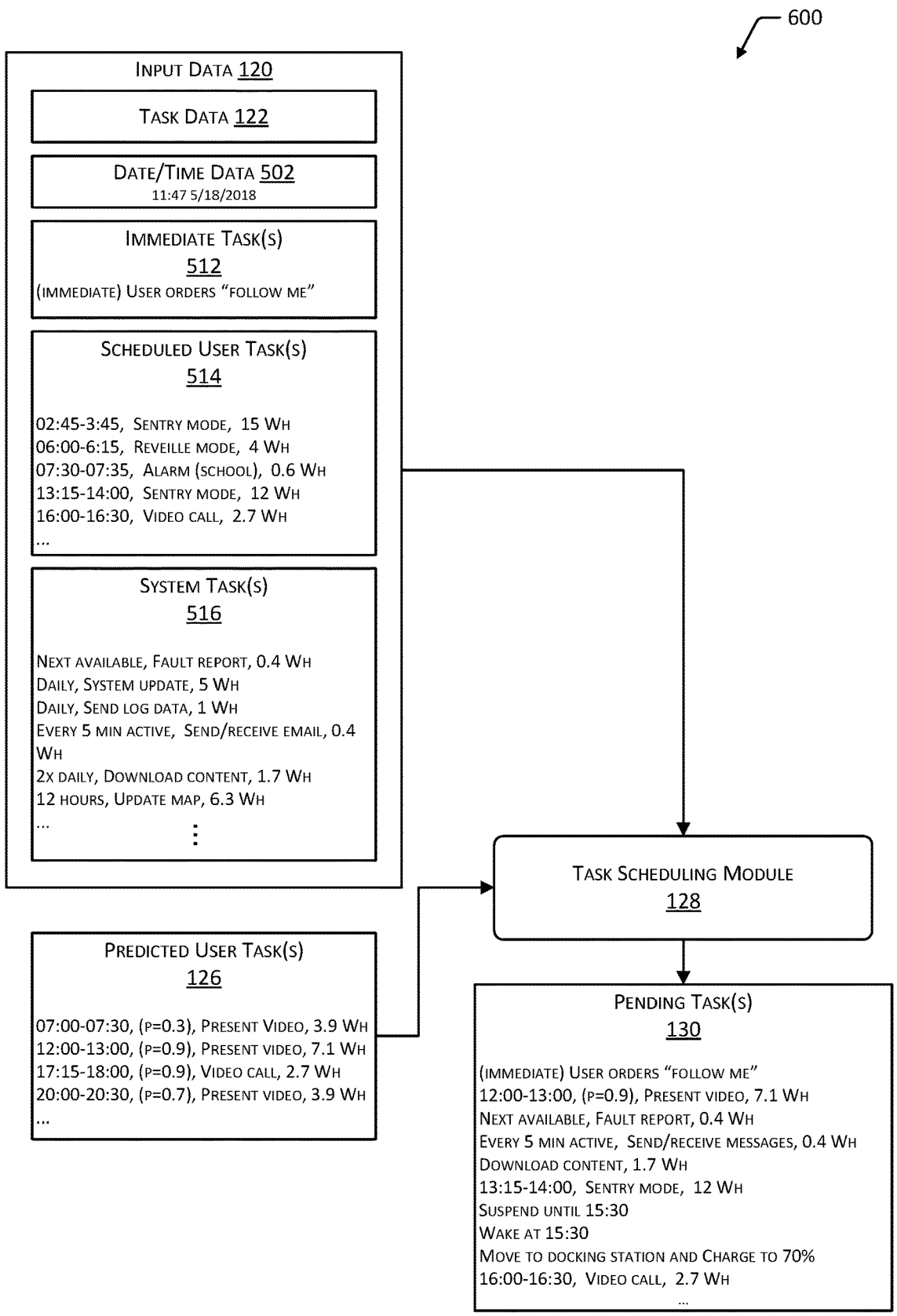
FIG. 6 illustrates some examples of input data and predicted user task data that is used to determine pending tasks, according to some implementations.

FIG. 6 illustrates 600 some examples of input data 120 and predicted user task data 126 that is used to determine a set of pending tasks 130, according to some implementations.

In this example, the current date/time data 502 indicates that the current time is 11:47. An immediate task 512 is pending in which the user 102 has ordered the robot 104 to perform a "follow me" task. The next one of the scheduled user tasks 514 is a sentry task from 13:15-14:00. The system tasks 516 include sending a fault report when the robot is next available. The predicted user tasks 126 include a predicted task of presenting video from 12:00-13:00 with a likelihood of occurrence 410 of 0.9 based on the history of occurrence and sensor data 228 that indicates the user 102 is present at the current time.

The task scheduling module 128 has processed this information as described above to determine a first set of pending tasks 130 that include performing the immediate "follow me" task, followed by being prepared for the unscheduled predicted task of the 1 hour presentation of video that is predicted to conclude at 13:00. The next scheduled task is the sentry mode at 13:15. The task scheduling module 128 may make use of the 15 minutes of time that is expected to be unused to perform the system tasks 516 of sending the fault report, sending and receiving messages, and downloading content. Once the sentry mode is complete, the robot 104 may then suspend until 15:30, when it is scheduled to wake and move to the docking station 134 and charge the battery 106 to the second charge capacity (e.g. 70%) in preparation for the following tasks 402.

If the actual use of the robot 104 deviates from that expected in the pending tasks 130, the robot 104 will dynamically adjust and update the predicted user tasks 126 and the pending tasks 130. For example, if the user 102 is not present in the home and does not perform the predicted 12:00-13:00 presentation of video, the pending tasks 130 may be updated to perform other system tasks 516 such as the software update, generating occupancy map data, and so forth before the scheduled sentry task.

Figure 7A:
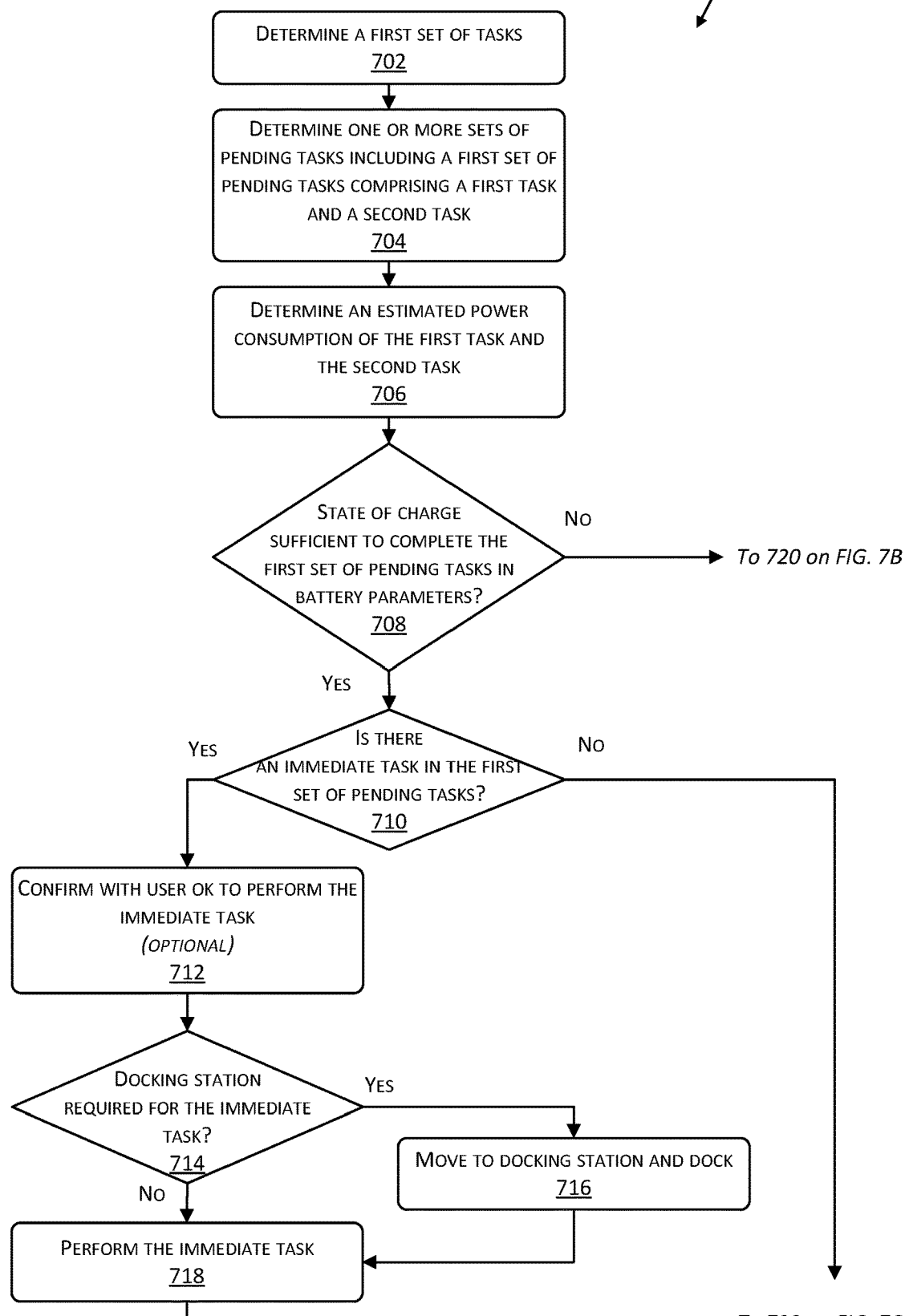
FIGS. 7A-7C is a flow diagram of a process to dynamically perform tasks and charging, according to some implementations.
Figure 7B:
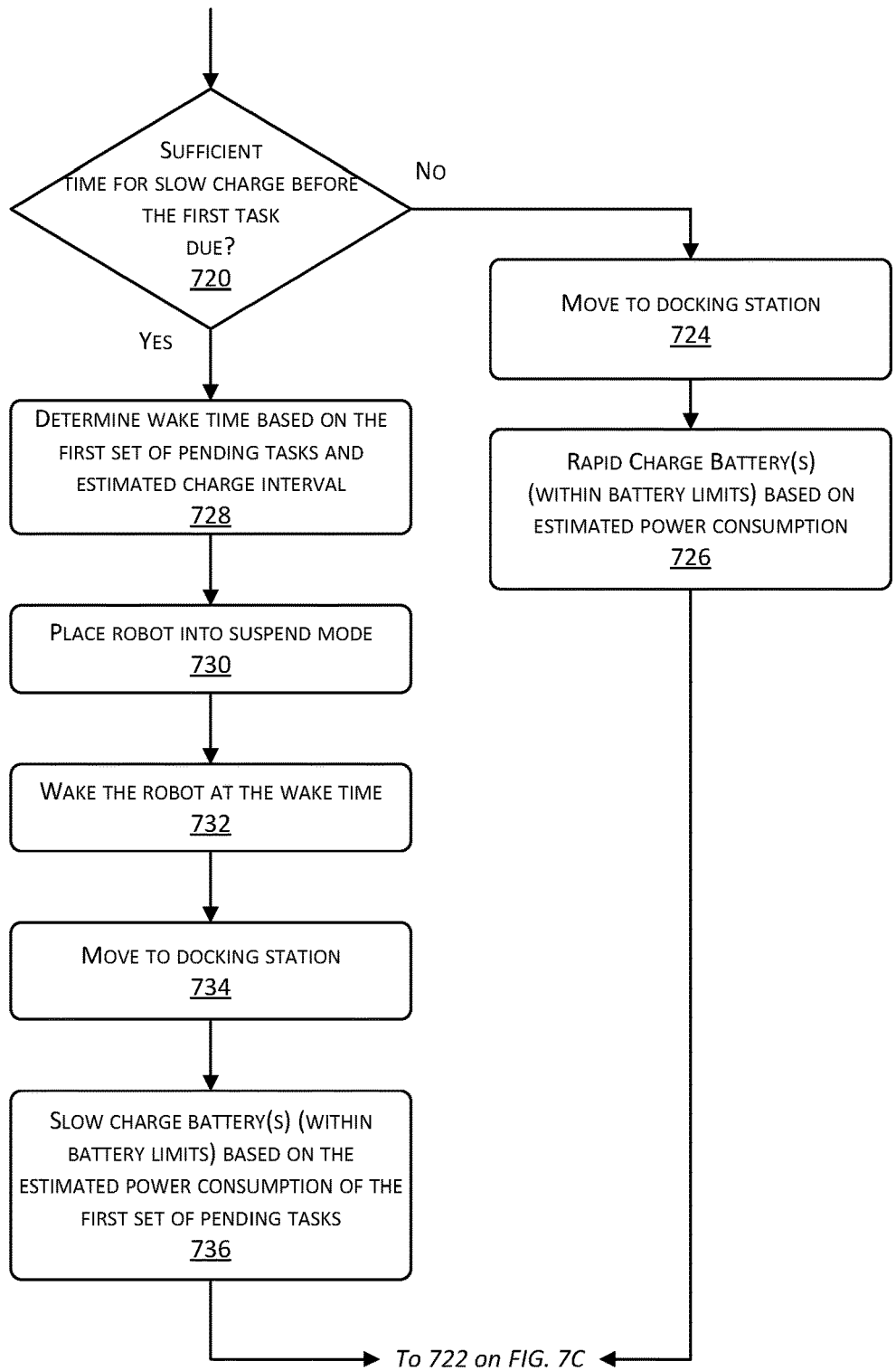
Figure 7C:
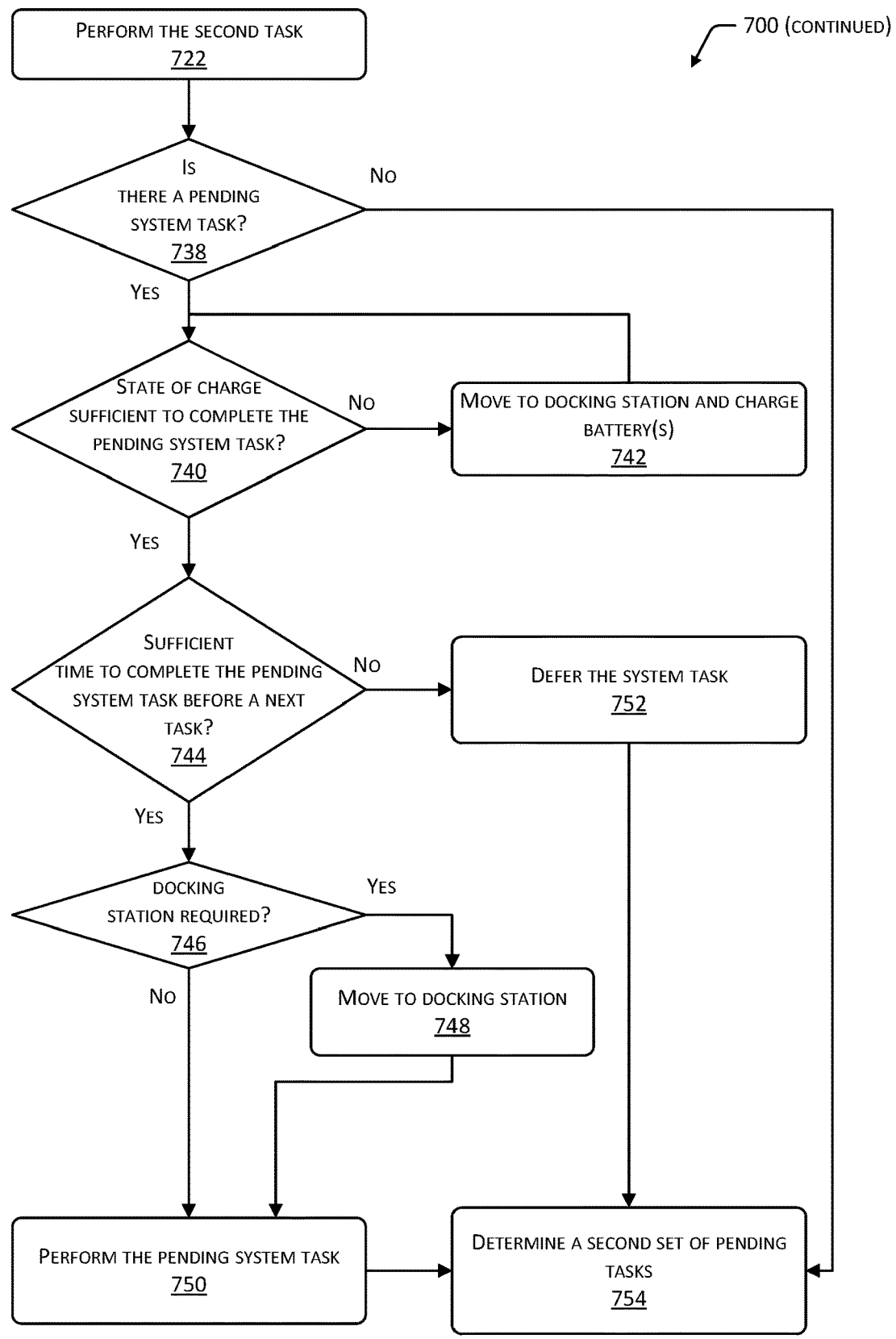

FIGS. 7A-7C are a flow diagram 700 of a process to dynamically perform tasks and charging, according to some implementations. The process may be implemented at least in part by one or more of the processors 108 on the robot 104, the servers 136, the docking station 134, or other devices 138.

As shown in FIG. 7A, at 702 a first set tasks 530 are determined. For example, the task scheduling module 128 may determine the set of tasks 530 based on one or more of the one or more immediate tasks 512, the one or more scheduled user tasks 514 that have start times 406 within a specified time interval of the current time, the one or more predicted user tasks 126 that have start times 406 within the specified time interval, or the one or more system tasks 516 that have start times 406 within the specified time interval.

At 704 one or more sets of pending tasks 130 may be determined. For example, the tasks in the first set of tasks 530 may be partitioned based on gaps between successive tasks that exceed a maximum wait time 520. In other implementations other techniques may be used to partition the first set of tasks 530. For example, a first set of pending tasks 130 may include a first task and a second task.

At 706 an estimated power consumption of the first set of pending tasks 130 is determined. For example, the power consumption 404 for each of the tasks 402 in the first set of pending tasks 130 may be determined based on the data in the task data 122 and summed together to determine the estimated power consumption.

At 708 a determination is made as to whether the state of charge 524 is sufficient to complete the first set of pending tasks 130 within the limits specified by the battery parameters 526. For example, is a difference between the state of charge 524 and the estimated power consumption greater than the first charge capacity of the battery 106? As described above, the first charge capacity may be indicative of a preferred minimum level to discharge the battery 106. If yes, the system proceeds to 710. If no, the system proceeds to 720.

At 710 a determination is made as to whether an immediate task 512 is in the first set of pending tasks 130. If so, the process proceeds to 712. At 712 the system may optionally confirm with the user 102 to approve performance of the immediate task 512. For example, if the immediate task 512 comprises an urgent software update, the robot 104 may notify the user 102 and seek the user's 102 approval to proceed, or defer the immediate task 512. The process may then proceed to 714.

At 714 a determination is made as to whether the docking station 134 is required for performance of the immediate task 512. For example, the system task parameters 518 may specify that a software update must be performed when docked. If the docking station 134 is required, the process proceeds to 716. At 716 the robot 104 may use the motors 380 to autonomously move to the docking station 134 and docks. The process then proceeds to 718 which performs the immediate task 512. The process may then proceed to 722.

Returning to 714, if the docking station 134 is not required for the immediate task 512, the process proceeds to 718 and performs the immediate task 512. Returning to 710, if there is not an immediate task 512 in the first set of pending tasks 130, the process may proceed to 722.

As continued in FIG. 7B, at 720 a determination is made as to whether there is sufficient time for slow charge at the first charge rate before the first task 402 is due. For example, an estimated charging time may be determined based on the first state of charge 524 in the battery 106, the total battery capacity such as indicated in the battery parameters 526, and a first charge rate provided by the docking station 134 to charge the battery 106. To determine the time before the first task is due, a difference between the current time indicated by the date/time data 502 and a first task start time 406 may be calculated. If the time before the task 402 is greater than the estimated charging time, the process may proceed to 728. If not, the process may proceed to 724.

At 724 the robot 104 autonomously moves to the docking station 134.

At 726, the robot 104 begins a rapid charge of the battery 106 at a second charge rate that is greater than the first charge rate. The battery 106 may be charged to a level that is based on the estimated power consumption while, preferably, leaving the battery 106 at the first charge capacity upon completion of the first set of pending tasks 130. The rapid charging may cease at the second charge capacity, that of optimum charge of the battery 106, unless the estimated power consumption requires more than the second charge capacity. For example, if the estimated power consumption would require the battery being charged to 65%, the robot 104 may rapid charge the battery to the 70% level corresponding to the second charge capacity specified by the battery parameters 526. However, if the estimated power consumption would require the battery being charged to 85%, the robot 104 may rapid charge the battery 106 to the 85% level or greater. Once the rapid charge is complete, the process may proceed to 722.

Returning to 720, if there is sufficient time for a slow charge, the process proceeds to 728. At 728 the wake time 532 is determined. The wake time 532 may be based at least in part on the current time, the start time of the first task in the first set of pending tasks 130, and an estimated charging time. For example, if the estimated charging time is 30 minutes, and the next task is scheduled in 2 hours, the wake time 532 may be set for 1.5 hours. In some implementations the wake time 532 may include an estimate time for the robot 104 to move to a particular location, such as to the docking station 134. The process then proceeds to 730.

At 730 the robot 104 places one or more components into a suspend mode that consumes less power than a wake mode. For example, the robot 104 may shutdown one or more sensors 114, reduce the operating frequency of the processor 108, and so forth.

At 732 the robot 104 transitions to the wake mode at the wake time 532. For example, a watchdog circuit may monitor output from the clock 202 and generate an interrupt. The interrupt may then trigger the transition to the wake mode.

At 734 the robot 104 autonomously moves to the docking station 134.

At 736 the robot 104 begins to slow charge the battery 106 using the first charge rate based on the estimated power consumption of the first set of pending tasks 130. The battery 106 may be charged to a level that is based on the estimated power consumption while, preferably, leaving the battery 106 at the first charge capacity upon completion of the first set of pending tasks 130. For example, if the estimated power consumption would require the battery being charged to 65%, in anticipation of using 30% of the capacity, the robot 104 may slow charge the battery to the 70% level corresponding to the second charge capacity specified by the battery parameters 526. However, if the estimated power consumption would require the battery being charged to 85%, the robot 104 may slow charge the battery 106 to the 85% level or greater. Once the slow charge is complete, the process may proceed to 722.

In other implementations, the robot 104 may move to the docking station 134 and charge before entering the suspend mode. The determination as to whether to charge before entering the suspend mode or charging after may be based at least in part on data indicative of the user 102 being proximate to the robot 104. For example, if the robot 104 detects that the user 102 is in the same room at the robot 104, the robot 104 may proceed as described above with regard to 728-736, remaining near the user 102. This keeps the robot 104 available to the user 102 for use. However, if the user 102 is absent or has left the home, the robot 104 may proceed to charge and then enter the suspend mode.

As continued in FIG. 7C, at 722 the second task in the first set of pending tasks 130 is performed. For this example, the first set of pending tasks 130 includes only the first task and the second task. At this point, the robot 104 has completed the pending tasks 130 that have been predicted and requested or scheduled. The robot 104 is now in the wake mode and is not otherwise busy. To minimize the transitions between the suspend and wake modes, the task scheduling module 128 may direct the robot 104 to perform one or more system tasks 516 that may have been included in the first set of pending tasks 130. In other implementations, the system tasks 516 that may be considered for execution may be included in a later set of pending tasks 130.

At 738 a determination is made as to whether there is a pending system task 512. For example, the first set of pending tasks 130 may include that a fault report is to be transmitted at a next available time.

At 740 a determination is made as to whether the state of charge 524 at this current time is sufficient to complete the pending system task 516 within the limits specified by the battery parameters 526. For example, is a difference between the state of charge 524 and an estimated power consumption by the system task 516 greater than the first charge capacity of the battery 106? If yes, the system proceeds to 744. If not, the system proceeds to 742.

At 742 the robot 104 autonomously moves to the docking station 134 and charges the battery 104. In another implementation the robot 104 may defer the system task 516 to a later time.

At 744 a determination is made as to whether there is sufficient time to complete the pending system task 516 before a next task 402 in the first set of pending tasks 130. For example, if the difference between the current time and the start time 406 of a third task is greater than an estimated duration of the system task 516, the process may proceed to 746. If not, the process may proceed to 752.

At 746 a determination is made as to whether the docking station 134 is required for performance of the system task 516. If yes, the process proceeds to 748. If no, the process proceeds to 750.

At 748 the robot 104 autonomously moves to the docking station 134 and docks. The process then proceeds to 750.

At 750 the pending system task 516 is performed.

Returning to 744, if there is insufficient time to complete the pending system task 516 before the next task, the process proceeds to 752. At 752 the system task 516 is deferred. For example, the system task 516 may be moved to the following set of pending tasks 130. The process may then proceed to 754. At 754 a second set of pending tasks 754 is determined. For example, the process may be performed again.

In other implementations the process may be varied. For example, performance of the system tasks 516 that require the docking station 134 may be deferred to situations in which the robot 104 is at the docking station 134 for charging.

Figure 8:
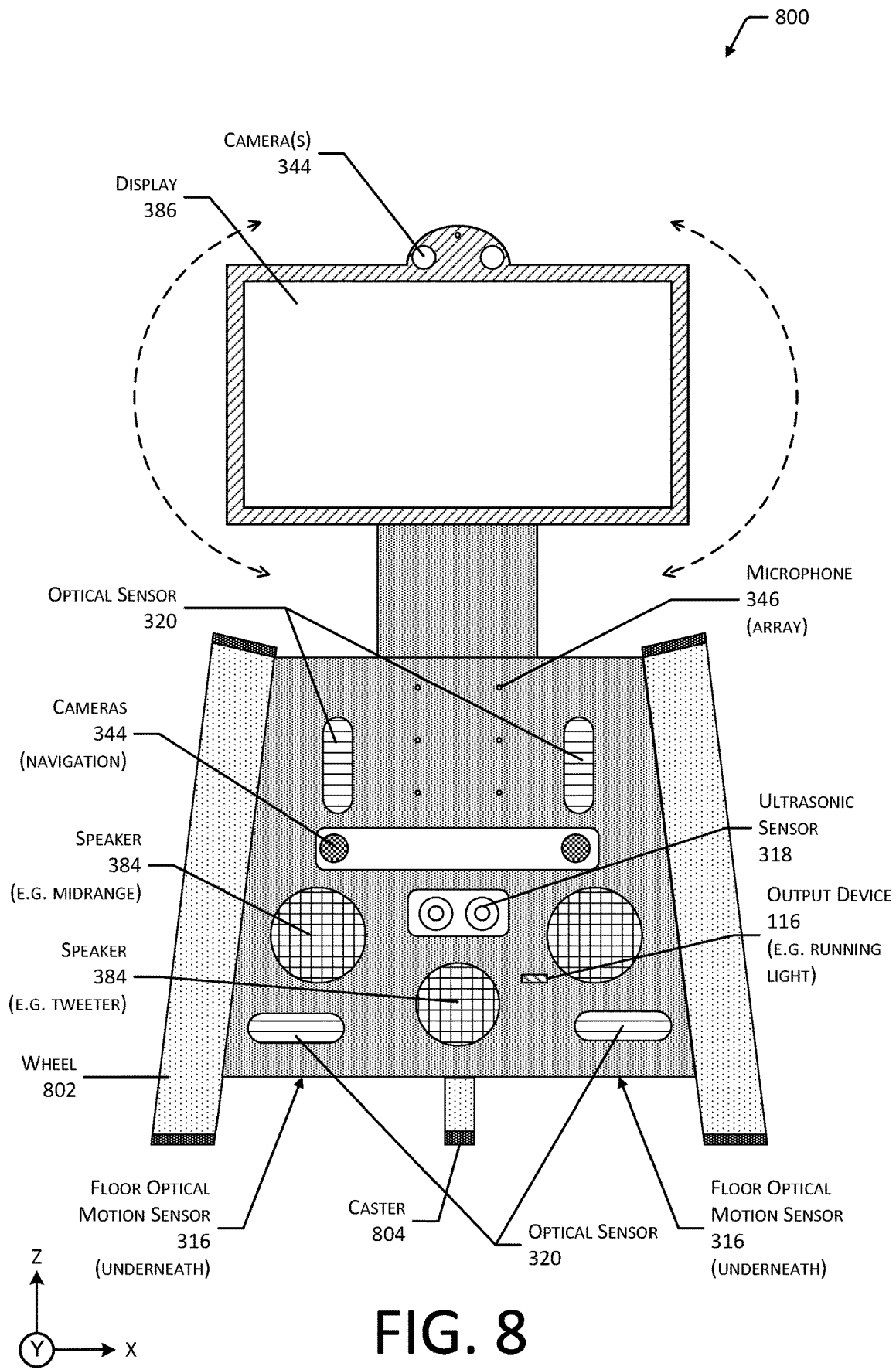
FIG. 8 is a front view of the robot, according to some implementations.

FIG. 8 is a front view 800 of the robot 104, according to some implementations. In this view, the wheels 802 are depicted on the left and right sides of a lower structure. As illustrated here, the wheels 802 are canted inwards towards an upper structure. In other implementations, the wheels 802 may be mounted vertically. The caster 804 is visible along the midline. The front section of the robot 104 includes a variety of sensors 114. A first pair of optical sensors 320 are located along the lower edge of the front while a second pair of optical sensors 320 are located along an upper portion of the front. Between the second set of the optical sensors 320 is a microphone 346 (array).

In some implementations, one or more microphones 346 may be arranged within or proximate to the display 386. For example, a microphone 346 array may be arranged within the bezel of the display 386.

A pair of cameras 344 separated by a distance are mounted to the front of the robot 104 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90° and 110°. A relatively wide FOV allows for easier detection of moving objects, such as users or pets that may be in the path of the robot 104. Also, the relatively wide FOV facilitates the robot 104 being able to detect objects when turning.

The sensor data 228 comprising images produced by this pair of cameras 344 can be used by the autonomous navigation module 220 for navigation of the robot 104. The cameras 344 used for navigation may be of different resolution from, or sensitive to different wavelengths than cameras 344 used for other purposes such as video communication. For example, the navigation cameras 344 may be sensitive to infrared light allowing the robot 104 to operate in darkness, while the camera 344 mounted above the display 386 sensitive visible light and is used to generate images suitable for viewing by a person. Continuing the example, the navigation cameras 344 may have a resolution of at least 300 kilopixels each while the camera 344 mounted above the display 386 may have a resolution of at least 10 megapixels. In other implementations, navigation may utilize a single camera 344.

In this illustration, the display 386 is depicted with cameras 344 arranged above the display 386. The cameras 344 may operate to provide stereoimages of the physical environment, the user 102, and so forth. For example, an image from each of the cameras 344 above the display 386 may be accessed and used to generate stereo image data about a face of a user 102. This stereoimage data may then be used to facial recognition, user identification, gesture recognition, gaze tracking, and so forth. In other implementations, a single camera 344 may be present above the display 386.

As described earlier, the display 386 may be mounted on a movable mount. The movable mount may allow the display 386 to move along one or more degrees of freedom. For example, the display 386 may tilt, rotate as depicted here, and so forth. The size the display 386 may vary. In one implementation, the display 386 may be approximately 8 inches as measured diagonally from one corner to another.

An ultrasonic sensor 318 is also mounted on the front of the robot 104 and may be used to provide sensor data 228 that is indicative of objects in front of the robot 104.

One or more speakers 384 may be mounted on the robot 104. For example, pyramid range speakers 384 are mounted on the front of the robot 104 as well as a high range speaker 384 such as a tweeter. The speakers 384 may be used to provide audible output such as alerts, music, human speech such as during a communication session with another user, and so forth.

One or more bumper switches 314 (not shown) may be present along the front of the robot 104. For example, a portion of the housing of the robot 104 that is at the leading edge may be mechanically coupled to one or more bumper switches 314.

Other output devices 116, such as one or more lights 382, may be on an exterior of the robot 104. For example, a running light may be arranged on a front of the robot 104. The running light may provide light for operation of one or more of the cameras 344, a visible indicator to the user 102 that the robot 104 is in operation, and so forth.

One or more of the FOMS 316 are located on an underside of the robot 104.

Figure 9:
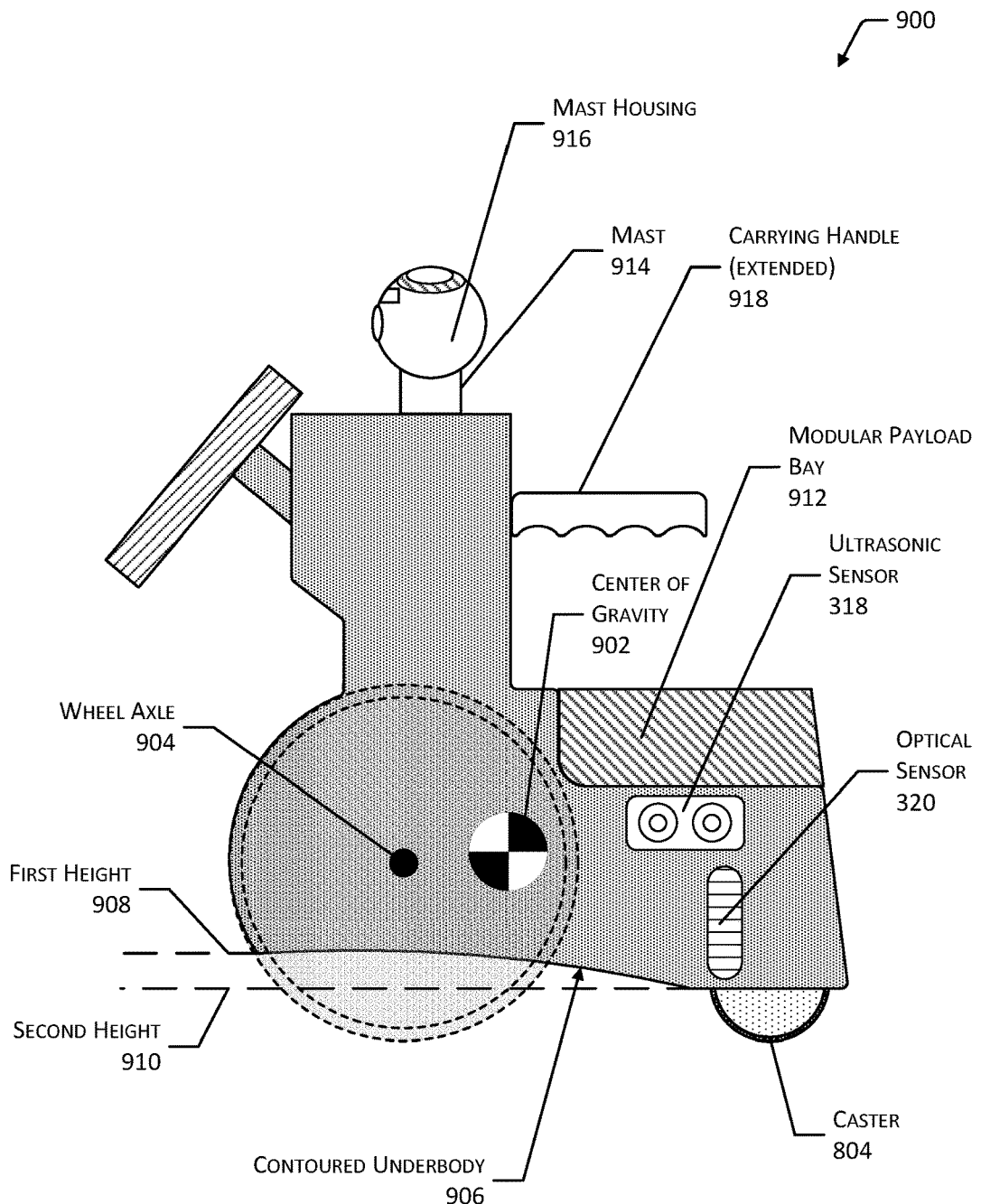
FIG. 9 is a side view of the robot, according to some implementations.

FIG. 9 is a side view 900 of the robot 104, according to some implementations.

The exterior surfaces of the robot 104 may be designed to minimize injury in the event of an unintended contact between the robot 104 and a user 102 or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing the robot 104 may comprise a shape-memory polymer that upon impact forms but then over time returns to the original shape.

In this side view, the left side of the robot 104 is depicted. An ultrasonic sensor 318 and an optical sensor 320 are present on either side of the robot 104.

As described above, the placement of the heavier components of the robot 104 may be arranged such that a center of gravity (COG) 902 is located between a wheel axle 904 of the front wheels 802 and the caster 804. Such placement of the COG 902 may result in improved stability of the robot 104 and may also facilitate lifting by the carrying handle.

In this illustration, the caster 804 is shown in a trailing configuration, in which the caster 804 is located behind or aft of the wheel axle 904 and the center of gravity 902. In another implementation (not shown) the caster 804 may be in front of the axle of the wheels 802. For example, the caster 804 may be a leading caster 804 positioned forward of the center of gravity 902.

The robot 104 may encounter a variety of different floor surfaces and transitions between different floor surfaces during the course of operation. The robot 104 may include a contoured underbody 906 that transitions from a first height 908 at the front of the robot 104 to a second height 910 that is proximate to the caster 804. This contour provides a ramp effect such that if the robot 104 encounters an obstacle that is below the first height 908, the contoured underbody 906 helps direct the robot 104 over the obstacle without lifting the driving wheels 802 clear from the floor. As a result, the robot 104 is better able to drive over small obstacles.

The robot 104 may include a modular payload bay 912 is located within the lower structure. The modular payload bay 912 provides one or more of mechanical or electrical connectivity with robot 104. For example, modular payload bay 912 may include one or more engagement features such as slots, cams, ridges, magnets, bolts, and so forth that are used to mechanically secure an accessory within the modular payload bay 912. In one implementation, the modular payload bay 912 may comprise walls within which the accessory may sit. In another implementation, the modular payload bay 912 may include other mechanical engagement features such as slots into which the accessory may be slid and engage.

The modular payload bay 912 may include one or more electrical connections. For example, the electrical connections may comprise a universal serial bus (USB) connection that allows for the transfer of data, electrical power, and so forth between the robot 104 and the accessory.

The robot 104 may incorporate a display 386 that may be utilized to present visual information to the user. In some implementations, the display 386 may be located with or affixed to the upper structure. In some implementations, the display 386 may comprise a touch screen that allows user input to be acquired. The display 386 may be mounted on a movable mount that allows motions along one or more axes. For example, the movable mount may allow the display 386 to be tilted, rotated, and so forth. The display 386 may be moved to provide a desired viewing angle to the user 102, to provide output from the robot 104, and so forth. For example, the output may comprise the display 386 being tilted forward and backward to provide a gestural output equivalent to a human nodding their head.

The robot 104 may incorporate a mast 914. The mast 914 provides a location from which additional sensors 114 or output devices 116 may be placed at a higher vantage point. The mast 914 may be fixed or extensible. The extensible mast 914 is depicted in this illustration. The extensible mast 914 may be transitioned between a retracted state, an extended state or placed at some intermediate value between the two.

At the top of the mast 914 may be a mast housing 916. In this illustration, the mast housing 916 is approximately spherical, however in other implementations other physical form factors such as cylinders, squares, or other shapes may be utilized.

The mast housing 916 may contain one or more sensors 114. For example, the sensors 114 may include a camera 344 having a field-of-view (FOV). In another example, the sensors 114 may include an optical sensor 320 to determine a distance to an object. The optical sensor 320 may look upward, and may provide information as to whether there is sufficient clearance above the robot 104 to deploy the mast 914. In another example, the mast housing 916 may include one or more microphones 346.

One or more output devices 116 may also be contained by the mast housing 916. For example, the output devices 116 may include a camera flash used to provide illumination for the camera 344, and indicator light that provides information indicative of a particular operation of the robot 104, and so forth.

Other output devices 116, such as one or more lights 382, may be elsewhere on an exterior of the robot 104. For example, a light 382 may be arranged on a side of the upper structure.

In some implementations, one or more of the sensors 114, output device 116, or the mast housing 916 may be movable. For example, the motor 380 may allow for the mast 914, the mast housing 916, or combination thereof to be rotated allowing the FOV to be panned from left to right.

The mast 914 may be configured as one or more safety features. For example, a portion of the mast 914 at the base of the mast 914 may be configured to deform or break in the event that a load exceeding a threshold amount is applied to the mast 914. In another implementation, the mounting point for the mast 914 to the upper structure includes one or more breakaway elements, allowing the mast 914 to break away from the upper structure in the event that a load exceeds the threshold amount. In yet another implementation, the mast 914 may comprise a flexible structure that bends when a load exceeding a threshold amount is applied to the mast 914.

In some implementations, the display 386 may be mounted to the mast 914. For example, the display 386 may be incorporated into the mast housing 916. In another example, the display 386 may be mounted to a portion of the mast 914, and so forth.

The robot 104 may occasionally need to be manually transported from one location to another. For example, the robot 104 may be unable to climb stairs, enter a vehicle, and so forth. To facilitate manual transportation, the robot 104 may include a carrying handle 918. The carrying handle 918 may be retractable such that, when not in use, the carrying handle 918 is not accessible. The carrying handle 918 may retract and deploy via translation, rotation, or extension. For example, the carrying handle 918 may slide out from the upper structure, or may rotate about a pivot point at one end. In the event the robot 104 is to be transported, the carrying handle 918 may be deployed. The carrying handle 918 may be positioned such that at least a portion of the carrying handle 918 is over the COG 902 of the robot 104. In another implementation, the carrying handle 918 may deploy upwards from the lower structure.

Deployment of the carrying handle 918 may include manual operation, such as the user pressing a handle release button, or may be electronically activated by the robot 104 using an electrically operated mechanism. For example, the electronic activation may involve the robot 104 generating a command that activates an electrically operated mechanism such as one or more of a motor, solenoid, piezoelectric material, electroactive polymer, shape-memory alloy, and so forth that releases a latch and allows a spring to push the carrying handle 918 into the deployed position. Continuing the example, the user may utter a command such as "robot, deploy carrying handle". Automated speech recognition systems may be used to recognize the utterance and as a result the electrically operated mechanism is activated. In another implementation, the electrically operated mechanism may provide the force that deploys the carrying handle 918. Retraction of the carrying handle 918 may be manual or electronically activated.

By utilizing a retractable carrying handle 918 may be stowed when not in use, safety of the robot 104 is improved. For example, the retracted carrying handle 918 is no longer exposed to be caught on some other object. Additionally, safety may be further improved by including safety interlock associated with the carrying handle 918. The safety interlock may be based on data such as information indicative of the deployment of the carrying handle 918, or may be based at least in part on sensor data 228. For example, a switch may be used to indicate whether the carrying handle 918 has been stowed. While the carrying handle 918 is extended, operation of one or more motors 380 in the robot 104 may be inhibited or otherwise prevented from being operated. For example, while the carrying handle 918 is extended, the motors 380 used to drive the wheels 802 may be rendered inoperable such that the robot 104 may not move. In another example, while the carrying handle 918 is extended, the mast 914 may be placed into a retracted position and remain there until the carrying handle 918 has been stowed. By limiting the motion of the robot 104 while the carrying handle 918 is extended for use, the possibility for an adverse interaction between the robot 104 and the user 102 is reduced.

Figure 10:
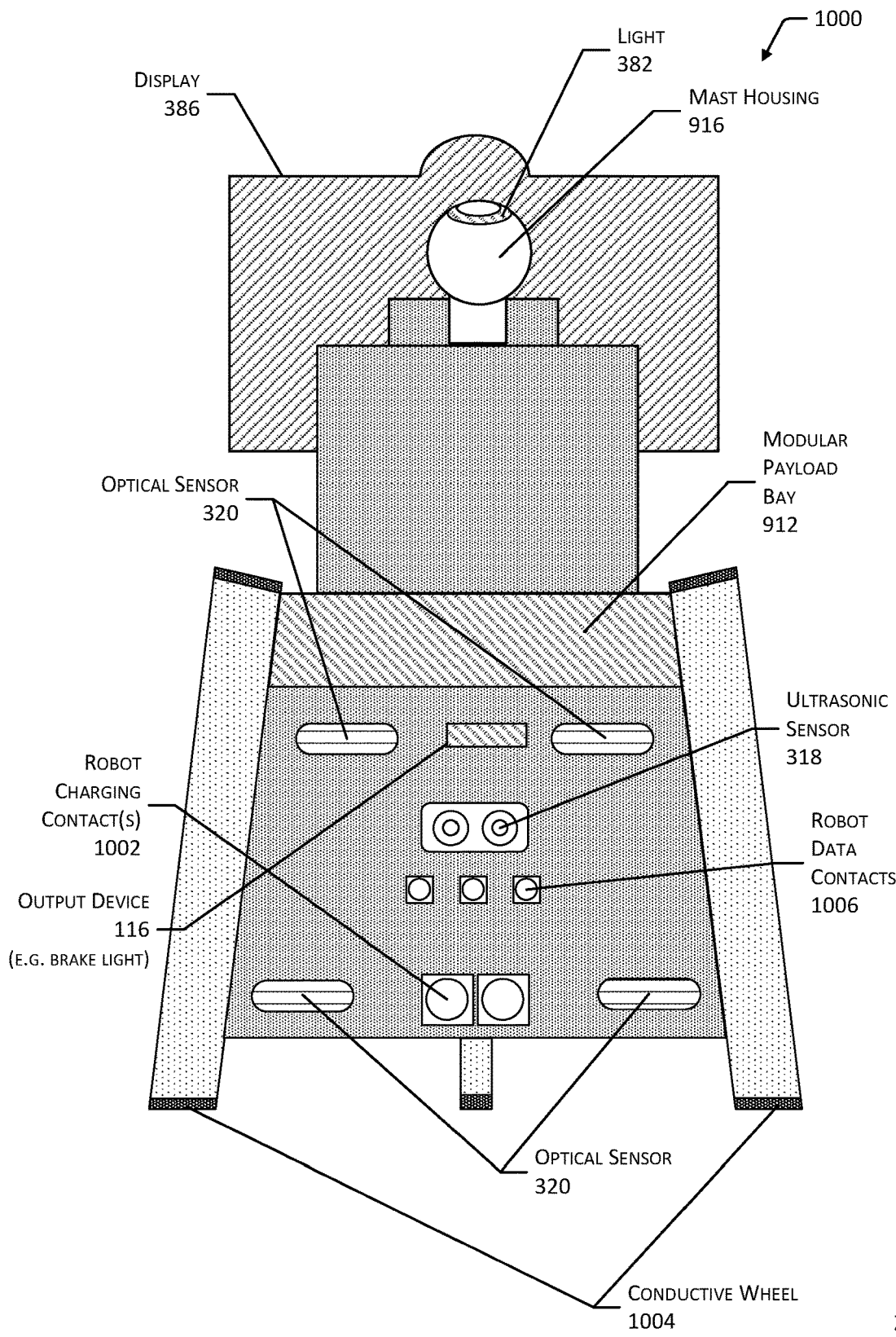
FIG. 10 is a back view of the robot, according to some implementations.

FIG. 10 is a back view 1000 of the robot 104, according to some implementations. In this view, as with the front, a first pair of optical sensors 320 are located along the lower edge of the rear of the robot 104, while a second pair of optical sensors 320 are located along an upper portion of the rear of the robot 104. An ultrasonic sensor 318 provides proximity detection for objects that are behind the robot 104.

Robot charging contacts 1002 may be provided on the rear of the robot 104. The charging contacts 1002 may comprise electrically conductive components that may be used to provide power from an external source such as a docking station 134 to the robot 104. In other implementations, wireless charging may be utilized. For example, wireless inductive or wireless capacitive charging techniques may be used to provide electrical power to the robot 104.

In some implementations the wheels 802 may be electrically conductive wheels 1004, that provide an electrical conductive pathway between the robot 104 and the floor.

One or more robot data contacts 1006 may be arranged along the back of the robot 104. The robot data contacts 1006 may be configured to establish contact with corresponding base data contacts within the docking station 134. The robot data contacts 1006 may provide optical, electrical, or other connections suitable for the transfer of data.

Other output devices 116, such as one or more lights, may be on an exterior of the back of the robot 104. For example, a brake light may be arranged on the back surface of the robot 104 to provide users an indication that the robot 104 is stopping.

Figure 11:
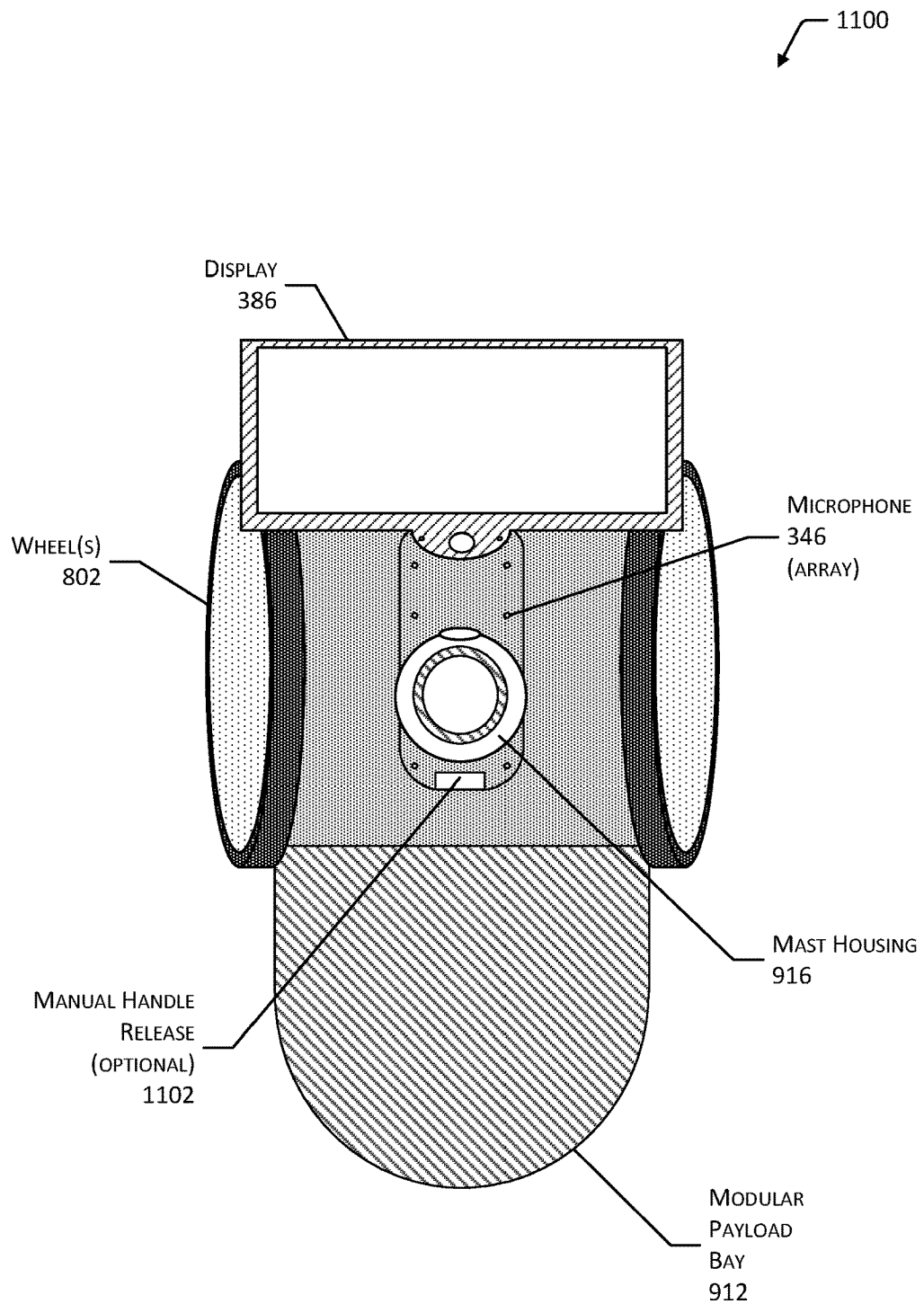
FIG. 11 is a top view of the robot, according to some implementations.

FIG. 11 is a top view 1100 of the robot 104, according to some implementations. In some implementations, a microphone 346 (array) may be emplaced along an upper surface of the upper structure. For example, the microphone 346 (array) is shown here comprising 8 microphones 346, two of which are concealed by the mast housing 916.

In some implementations, a manual handle release 1102 may be optionally provided. For example, the manual handle release 1102 when actuated may result in the carrying handle 918 being extended.

Figure 12:
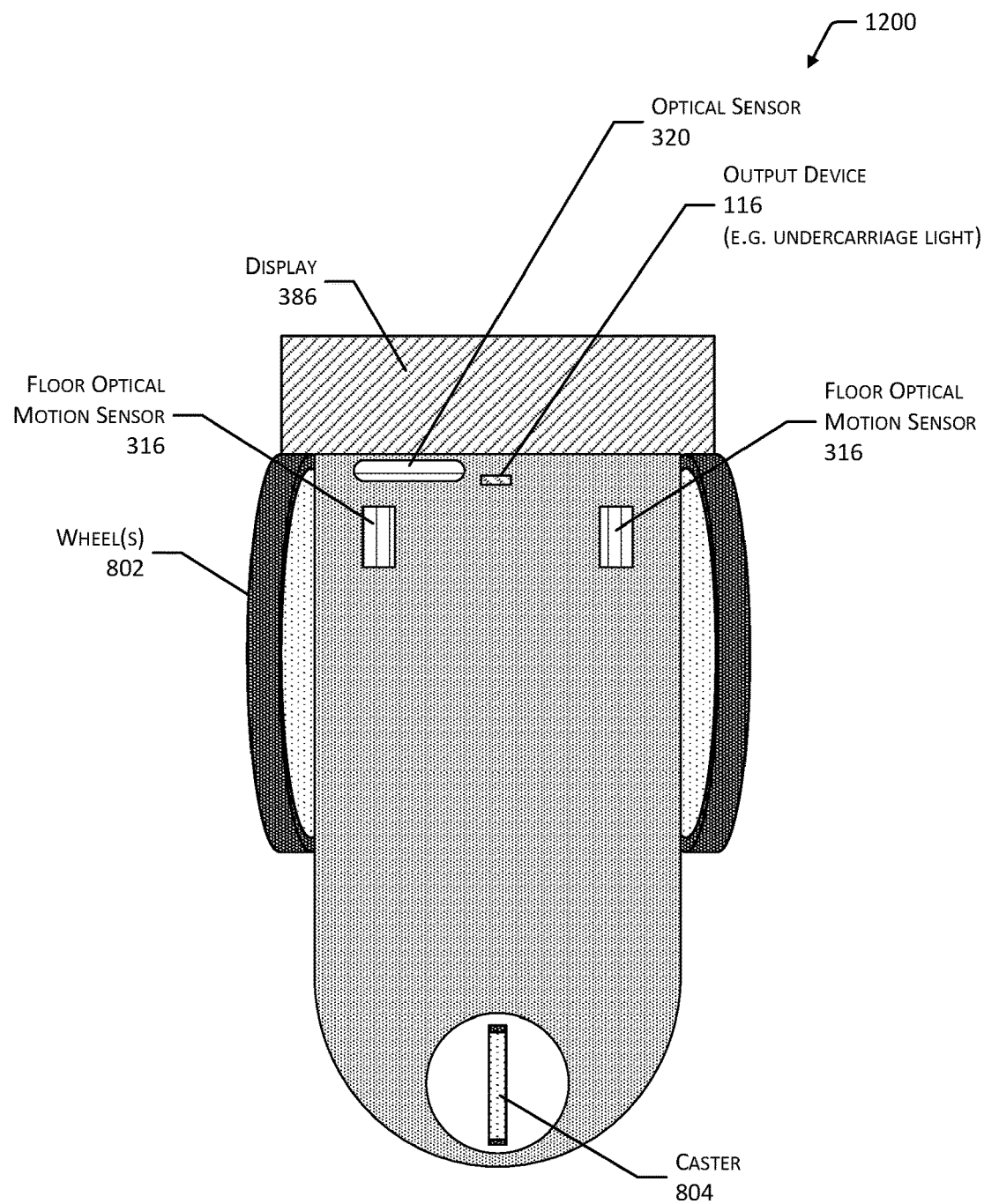
FIG. 12 is a bottom or underside view of the robot, according to some implementations.

FIG. 12 is a bottom 1200 or underside view of the robot 104, according to some implementations. In this illustration, a pair of FOMS 316 are visible and arranged on the underside of the robot 104 proximate to the front and on the left and right sides, proximate to the wheels 802. In another implementation, one or more FOMS 316 may be arranged along a centerline of the robot 104 running front and back.

One or more optical sensors 320 may be mounted on the underside proximate to one or more of the front edge or back edge of the robot 104. These optical sensors 320 may be used to detect the presence of a falling edge, such as a stair. For example, the optical sensors 320 mounted on the front or rear of the robot 104 may have a field-of-view (FOV) that results in a blind spot close to the robot 104. In the event that the user 102 picks up and moves the robot 104, the robot 104 could be placed into a situation where it is unable to move safely without toppling from a falling edge. As a result, optical sensors 320 may be mounted at or near the underside of the robot 104 to provide information about this region.

In other implementations, other sensors 114 may be mounted elsewhere to determine falling edges. For example, the optical sensors 320 on the front of the robot 104 may have a FOV that is directed downwards to allow for detection of the falling edge.

An output device 116, such as one or more undercarriage lights may be provided. For example, a light may be arranged on an underside of the robot 104, proximate to or at a front edge.

Also depicted is the caster 804. In one implementation, the caster 804 may be freewheeling, that is free to swivel about. In another implementation, the caster 804 may be driven, such that a motor 380 or other actuator may change the direction of the caster 804 to facilitate steering of the robot 104.

Figure 13:
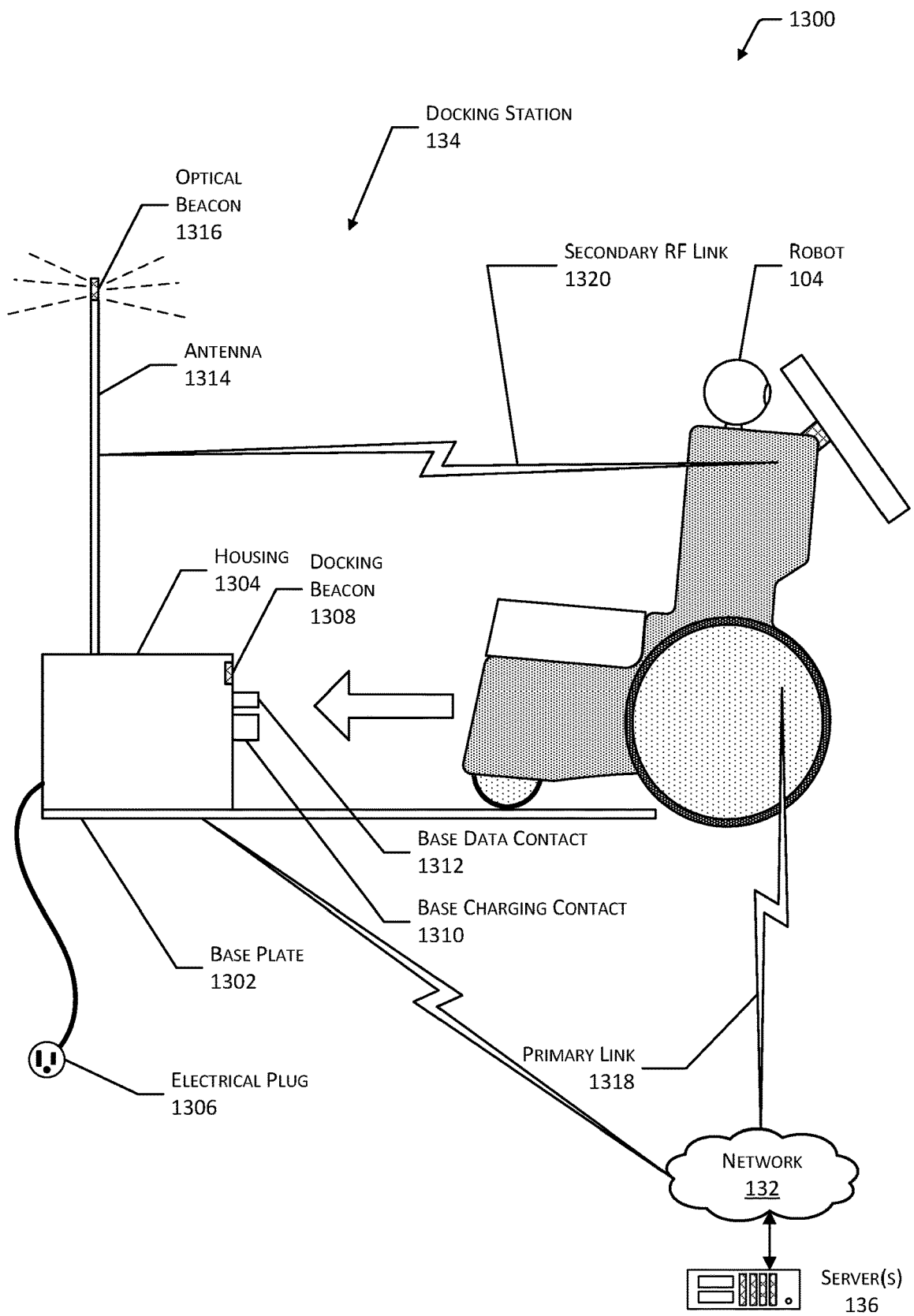
FIG. 13 depicts a diagram of a docking station with a secondary radio frequency link interface, according to some implementations.

FIG. 13 depicts a diagram 1300 of a docking station 134 with a secondary RF link interface 306, according to some implementations. The docking station 134 may comprise a base plate 1302. A housing 1304 may include electronics such as a power supply, one or more processors, one or more communication interfaces, and so forth. The docking station 134 may obtain power from an electrical plug 1306. For example, the electrical plug 1306 may be plugged into a household electrical outlet. In some implementations, the docking station 134 may include an uninterruptible power supply or alternative power source such as a fuel cell.

A docking beacon 1308 provides indicia suitable for guiding the robot 104 into the docking station 134 at a predetermined location. At that predetermined location, the robot 104 may engage one or more base charging contacts 1310 or base data contacts 1312. For example, the robot charging contacts 1002 may come in contact with the corresponding base charging contacts 1310 while the robot data contacts 1006, the contact with the corresponding base data contacts 1312. In other implementations, one or more of the base charging contacts 1310 or the base data contacts 1312 may be along the base plate 1302, or otherwise configured to mate with corresponding robot charging contacts 1002 or robot data contacts 1006 located on an underside of the robot 104.

In other implementations, wireless power transfer may be used to charge the robot 104. For example, the base charging contacts 1310 may be omitted and a wireless inductive or wireless capacitive charging system may be used to provide electrical power to the robot 104.

The base charging contacts 1310 may be utilized to provide electrical power to charge the batteries on board the robot 104, supply power to the robot for operation while docked, and so forth. The robot 104 or the docking station 134 may include battery charger circuitry to control charging of the batteries on board the robot 104. The battery charger circuitry may be configured to charge the batteries at a first rate, second rate, and so forth. For example, the first rate may exhibit a lower amperage than the second rate, and may take longer to charge relative to the second rate. In some implementations, the first rate may be configured to minimize heating of cells within the batteries on board the robot 104, reduce damage charging damage, and so forth.

The base data contacts 1312 may be used to provide data communication with the robot 104 while docked. For example, the base data contacts 1312 may be used to deliver updates to the instructions stored within the memory 112 of the robot 104.

The docking station 134 may include an antenna 1314 suitable for use with one or more of the network interfaces 110. For example, the antenna 1314 may be used for the secondary RF link interface 306.

One or more optical beacons 1316 may be provided on the docking station 134 to facilitate the robot 104 locating the docking station 134 within the physical environment. For example, the optical beacons 1316 may be placed atop the antenna 1314 to provide and improve line of sight with the robot 104. In some implementations, the robot 104 may utilize the camera 344 in the mast housing 916 to detect the optical beacon 1316. For example, the mast 914 may be extended to increase the height of the mast housing 916 and the camera 344 therein. The increased height of the camera 344 combined with the location of the optical beacons 1316 atop antenna 1314 may provide an improved line of sight for the robot 104, facilitating locating of the docking station 134 by the robot 104.

The robot 104 may utilize a primary link 1318 to establish communication with other devices such as the network 132, one or more servers 136, the docking station 134, of the robot's 104, and so forth. For example, the primary link 1318 may comprise a WLAN interface 302.

In some implementations, the primary link 1318 may be unavailable. For example, a portion of the home may have inadequate Wi-Fi coverage. As described above, the docking station 134 may include a secondary RF link interface 306 that establishes a secondary RF link 1320 with the robot 104. In the event that a primary link 1318 is unavailable, the robot 104 may maintain communication with the docking station 134 using secondary RF link 1320. The docking station 134 may utilize one or more network interfaces 110 on board the docking station 134 to establish communication with the network 132 or other devices 138. Continuing the example above, if the robot 104 finds itself in an area with inadequate Wi-Fi coverage, it may use the secondary RF link 1320 to access the docking station 134 and then access an external server 136 via the docking station 134.

In some implementations, the secondary RF link 1320 may also be used for navigational purposes. For example, secondary RF link 1320 may be used as a beacon to provide navigational input. In another example, the secondary RF link 1320 may be used to determine a distance from the docking station 134. Continuing this example, the robot 104 may send a request to the docking station 134 which then responds within a predetermined time. Based on the value of the predetermined time and the propagation delay associated with transmission, an estimated distance between the docking station 134 and robot 104 may be determined.

The docking station 134 may provide other functions as well. For example, the docking station 134 may include additional resources such as processors, memory, and so forth that allow the docking station 134 to provide various functions such as automated speech recognition, natural language understanding, and so forth. For example, if the robot 104 is unable to contact an external server 136 to process speech acquired using a microphone 346, the audio data 236 may be transmitted to the docking station 134 for local processing by the docking station 134. This may provide redundancy and still allow some functionality in the event that a wide area network connection, such as to the internet, is unavailable. In some implementations, the docking station 134 may be configured to operate as an edge server to a network accessible resource, such as an external server.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
one or more sensors;
one or more motors coupled to one or more wheels;
a battery;
a clock; and
one or more processors to execute instructions to:
perform a first task;
access battery charge parameters indicative of:
a total battery capacity,
a first charge capacity indicative of a predetermined portion of the total battery capacity, and
a second charge capacity indicative of a predetermined portion of the total battery capacity that is greater than the first charge capacity and less than the total battery capacity;
determine, at a current time, a first set of pending tasks comprising a second task and a third task, wherein the second task is to occur at a first start time and the third task is to occur at a second start time that is after the first start time;
determine, based on task data obtained during an earlier performance of the second task and an earlier performance of the third task, a first estimated power consumption of the second task and the third task;
determine a first state of charge in the battery;
determine that a first difference between the first state of charge and the first estimated power consumption is less than the first charge capacity;
move the device, using the one or more motors, to dock with a docking station;
determine an estimated charging time based on the first state of charge, the total battery capacity, and a first charge rate provided by the docking station to charge the battery;
determine a second difference between the current time indicated by the clock and the first start time is greater than the estimated charging time;
charge the battery, using the docking station, at the first charge rate;
determine a wake time that is a predetermined time interval before the first start time;
transition one or more components of the device from a first mode to a second mode, wherein the second mode uses less power than the first mode;
determine, based on the current time indicated by the clock, that the wake time has been reached or exceeded;
transition the one or more components of the device from the second mode to the first mode;
perform the second task at the first start time; and
perform the third task at the second start time.

2. The device of claim 1, wherein the second task and the third task are associated with one or more user accounts; and further comprising the one or more processors to execute instructions to:
determine a fourth task is to occur at a third start time, wherein the fourth task is associated with maintaining the device in an operational condition;
determine a pending system task having a first estimated completion time;

determine, based on the task data, a second estimated power consumption of the fourth task and the pending system task;
determine a second state of charge;
determine that a difference between the second state of charge and the second estimated power consumption is greater than the first charge capacity;
determine a difference between the current time indicated by the clock and the third start time is greater than the first estimated completion time; and
perform the pending system task.

3. The device of claim 1, wherein the task data further comprises an estimated start time and a likelihood of occurrence of a previously performed fourth task; and
the instructions to determine the first set of pending tasks comprising instructions to:
determine a score for the previously performed fourth task in the task data, wherein the score is based on:
the current time,
the estimated start time for the previously performed fourth task, and
the likelihood of occurrence for the previously performed fourth task; and
determine, based on the score, the second task.

4. A device comprising:
one or more sensors;
one or more motors coupled to one or more wheels;
a battery;
a clock; and
one or more processors to execute instructions to:
determine a first set of pending tasks, the first set of pending tasks comprising a first task to occur at a first start time;
determine a first estimated power consumption indicative of a sum of estimated power consumption for individual tasks in the first set of pending tasks;
determine a first state of charge of the battery;
determine a first charge capacity of the battery that is less than a total battery capacity of the battery;
determine that a difference between the first state of charge and the first estimated power consumption is less than the first charge capacity;
move the device, using the one or more motors, to connect to a docking station; and
charge the battery to the first charge capacity, using the docking station.

5. The device of claim 4, further comprising the one or more processors to execute instructions to:
determine a wake time based at least in part on the first start time;
transition one or more components of the device from a first mode to a second mode, wherein the second mode uses less power than the first mode;
determine, based on a current time indicated by the clock, that the wake time has been reached or exceeded;
transition the one or more components of the device from the second mode to the first mode; and
perform the first task.

6. The device of claim 4, the instructions to determine the first set of pending tasks comprising instructions to:
determine a score for a second task, wherein the score is based on:
a current time,
an estimated start time for the second task,
a likelihood of occurrence of the second task, and
data indicative of one or more of:
proximity of a user to the device,
presence of the user at a same facility as the device, or
user calendar data indicative of a user's schedule; and
based on the score, include the second task in the first set of pending tasks.

7. The device of claim 4, the instructions to determine the first set of pending tasks further comprising the one or more processors to execute instructions to:
determine a first set of tasks comprising:
one or more immediate tasks, wherein the one or more immediate tasks have start times of a current time;
one or more scheduled user tasks that have start times within a first time interval of the current time;
one or more predicted user tasks that have start times within the first time interval; and
one or more system tasks that have start times within the first time interval; sort the first set of tasks based on the start times;
determine a first wait time between performance of one or more tasks;
determine a first gap time that is indicative of a start of a first interval between two tasks in the first set of tasks, wherein the first interval has a duration that exceeds the first wait time; and
include in the first set of pending tasks those tasks in the first set of tasks with start times between the current time and the first gap time.

8. The device of claim 4, further comprising the one or more processors to execute instructions to:
determine that a difference between a current time and the first start time exceeds an expected duration of a system task in the first set of pending tasks;
determine a second estimated power consumption of the system task in the first set of pending tasks;
determine a second state of charge of the battery;
determine that a difference between the second state of charge and the second estimated power consumption is greater than the first charge capacity;
determine that there is sufficient time before the first start time to charge the battery to a value that is greater than or equal to a sum of:
the first charge capacity, and
the first estimated power consumption, less the second estimated power consumption; and
perform the system task prior to the first start time.

9. The device of claim 4, further comprising the one or more processors to execute instructions to:
determine a first estimated charging time based on the first state of charge, the first estimated power consumption, and a first charge rate provided by the docking station to charge the battery;
determine that a difference between a current time indicated by the clock and the first start time is greater than the first estimated charging time; and
wherein the battery is charged at the first charge rate.

10. The device of claim 4, further comprising the one or more processors to execute instructions to:
determine a second charge capacity of the battery that is greater than the first charge capacity and less than the total battery capacity of the battery;
determine that a difference between the second charge capacity and the first estimated power consumption is greater than the first charge capacity; and
charge the battery to the second charge capacity.

11. The device of claim 4, further comprising the one or more processors to execute instructions to:
based on historical data indicative of performance of one or more tasks by the device, determine a first idle interval, wherein the first idle interval:
has no scheduled user tasks,
has no predicted user tasks having a confidence level greater than a threshold value, and
has no previously scheduled system tasks; and
perform a system task during the first idle interval.

12. A computer-implemented method comprising:
determining, for a device, a first set of pending tasks comprising a first task to occur at a first start time;
determining a first estimated power consumption indicative of a sum of estimated power consumption for individual tasks in the first set of pending tasks;
determining a first state of charge of a battery of the device;
determining a first charge capacity of the battery that is less than a total battery capacity of the battery;
determining a difference between the first state of charge and the first estimated power consumption is less than the first charge capacity;
moving the device autonomously from a first location to a charging station;
charging the battery to the first charge capacity with the charging station; and
performing the first task on or after the first start time.

13. The computer-implemented method of claim 12, further comprising, before moving the device from the first location:
determining a first estimated charging time of the battery of the device based on:
the first state of charge,
the first charge capacity,
the first estimated power consumption, and
a first charge rate associated with the charging station;
determining a wake time based at least in part on:
the first start time, and
the first estimated charging time;
transitioning one or more components of the device from a first mode to a second mode, wherein the second mode uses less power than the first mode;
determining, based on a current time indicated by a clock, that the wake time has been reached or exceeded; and
transitioning, the one or more components of the device from the second mode to the first mode.

14. The computer-implemented method of claim 12, the determining the first set of pending tasks comprising:
determining a first set of tasks comprising:
one or more immediate tasks, wherein the one or more immediate tasks have start times of a current time;
one or more scheduled user tasks that have start times within a first time interval of the current time;
one or more predicted user tasks that have start times within the first time interval; and
one or more system tasks that have start times within the first time interval;
sorting tasks within the first set of tasks based on the start times;
determining a first gap time that is indicative of a start of a first interval between two consecutive tasks in the first set of tasks, wherein the first interval has a duration that exceeds a predetermined value; and
including in the first set of pending tasks those tasks in the first set of tasks with start times between the current time and the first gap time.

15. The computer-implemented method of claim 12, the determining the first task and the first start time based at least in part on one or more of:
a current time,
an estimated start time for the first task,
a likelihood of occurrence of the first task,
sensor data obtained by the device,
sensor data obtained by one or more other devices,
data indicative of presence of a user at a same location as the device, or user calendar data indicative of a schedule of a user associated with the device.

16. The computer-implemented method of claim 12, further comprising:
determining that a difference between a current time and the first start time exceeds an expected duration of one or more system tasks in the first set of pending tasks;
determining a second estimated power consumption indicative of a sum of estimated power consumption for individual ones of the system tasks in the first set of pending tasks;
determining estimated move power indicative of power consumed to move the device from the first location to the charging station;
determining that a difference between the first state of the charge and a power consumption that includes the estimated move power and the second estimated power consumption is greater than the first charge capacity;
determining a first estimated charging time indicative of a time to charge the battery of the device with the charging station;
determining that a sum of the first estimated charging time and the expected duration of the one or more system tasks in the first set of pending tasks is less than a difference between the current time indicated by a clock and the first start time; and
performing the one or more system tasks prior to the moving of the device to the charging station.

17. The computer-implemented method of claim 12, further comprising:
determining a first estimated charging time based on the first state of charge, the first estimated power consumption, and a first charge rate provided by the charging station to charge the battery;
determining a difference between a current time indicated by a clock and the first start time is greater than the first estimated charging time; and
charging the battery at the first charge rate.

18. The computer-implemented method of claim 12, further comprising:
determining a second charge capacity that is greater than the first charge capacity and less than the total battery capacity of the battery;
determining that a difference between the second charge capacity and the first estimated power consumption is greater than the first charge capacity; and
charging the battery to the second charge capacity.

19. The computer-implemented method of claim 12, further comprising:
determining the first estimated power consumption is greater than a second charge capacity, wherein the second charge capacity is greater than the first charge capacity and less than the total battery capacity of the battery; and
charging the battery to the total battery capacity.

20. The computer-implemented method of claim 12, further comprising:
- based on historical data indicative of performance of one or more tasks by the device, determining a first idle interval, wherein the first idle interval:
  - has no scheduled user tasks,
  - has no predicted user tasks having a likelihood of occurrence that is greater than a threshold value, and
  - has no previously scheduled system tasks; and
- performing one or more system tasks during the first idle interval.

* * * * *

UNITED STATES PATENT AND TRADEMARK OFFICE
CERTIFICATE OF CORRECTION

| | | |
|---|---|---|
| PATENT NO. | : 11,400,823 B1 | |
| APPLICATION NO. | : 15/950651 | |
| DATED | : August 2, 2022 | |
| INVENTOR(S) | : Sridhar Sampath et al. | |

It is certified that error appears in the above-identified patent and that said Letters Patent is hereby corrected as shown below:

In the Claims

Column 42, Claim 7, Lines 19-21:
Currently read:
"one or more system tasks that have start times within the first time interval; sort the
first set of tasks based on the start times;"

Where they should read:
--one or more system tasks that have start times within the first time interval;
sort the first set of tasks based on the start times;--.

Column 44, Claim 15, Lines 9-11:
Currently read:
"data indicative of presence of a user at a same location as the device, or user
calendar data indicative of a schedule of a user associated with the device."

Where they should read:
--data indicative of presence of a user at a same location as the device, or
user calendar data indicative of a schedule of a user associated with the device.--.

Signed and Sealed this
Thirtieth Day of August, 2022

*Katherine Kelly Vidal*
Katherine Kelly Vidal
*Director of the United States Patent and Trademark Office*